(12) United States Patent
Ye et al.

(10) Patent No.: US 11,662,555 B2
(45) Date of Patent: May 30, 2023

(54) OPTICAL IMAGING LENS INCLUDING EIGHT LENSES OF +−++−+−−, +−++−−+−, +−++−−−−, +−++−++−, +−+−−+−−, +−+−−−−−, +−+−++−− +−+−−++−, +−+−+++− OR +−+−+−−− REFRACTIVE POWERS

(71) Applicant: ZHEJIANG SUNNY OPTICAL, CO., LTD, Zhejiang (CN)

(72) Inventors: Lihui Ye, Zhejiang (CN); Lingbo He, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 280 days.

(21) Appl. No.: 16/644,965

(22) PCT Filed: Aug. 14, 2018

(86) PCT No.: PCT/CN2018/100480
§ 371 (c)(1),
(2) Date: Mar. 6, 2020

(87) PCT Pub. No.: WO2019/100768
PCT Pub. Date: May 31, 2019

(65) Prior Publication Data
US 2021/0173183 A1   Jun. 10, 2021

(30) Foreign Application Priority Data

Nov. 22, 2017 (CN) .......................... 201711172644.9
Nov. 22, 2017 (CN) .......................... 201721571215.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 5,212,597 A | 5/1993 | Yamada |
| 5,642,229 A | 6/1997 | Kaneko et al. |

(Continued)

FOREIGN PATENT DOCUMENTS

| CN | 106443986 A | 2/2017 |
| CN | 106896473 A | 6/2017 |

(Continued)

*Primary Examiner* — Wen Huang
(74) *Attorney, Agent, or Firm* — Yu Gang

(57) ABSTRACT

The disclosure discloses an optical imaging lens, which includes a first lens, a second lens, a third lens, a fourth lens, a fifth lens, a sixth lens, a seventh lens and an eighth lens which are provided in sequence from an object side to an imaging side along an optical axis, the first lens has a positive refractive power, and an object-side surface of the first lens is a convex surface; the second lens has a negative refractive power; the third lens has a positive refractive power; the fourth lens has a positive refractive power or a negative refractive power, an object-side surface of the fourth lens is a concave surface and an imaging-side surface is a convex surface; the fifth lens has a positive refractive power or a negative refractive power; the sixth lens has a positive refractive power or a negative refractive power, and an object-side surface of the sixth lens is a convex surface; the seventh lens has a positive refractive power or a negative refractive power; and the eighth lens has a negative refractive power.

20 Claims, 13 Drawing Sheets

(56) References Cited

U.S. PATENT DOCUMENTS

2019/0056568 A1\* 2/2019 Huang ............... G02B 13/0045
2019/0310445 A1\* 10/2019 Hashimoto ........ G02B 13/0045

FOREIGN PATENT DOCUMENTS

| CN | 107085285 A | 8/2017 |
| CN | 107703609 A | 2/2018 |
| CN | 107741630 A | 2/2018 |
| CN | 107831588 A | 3/2018 |
| CN | 207424362 U | 5/2018 |
| CN | 108121053 A | 6/2018 |
| CN | 108445610 A | 8/2018 |

\* cited by examiner

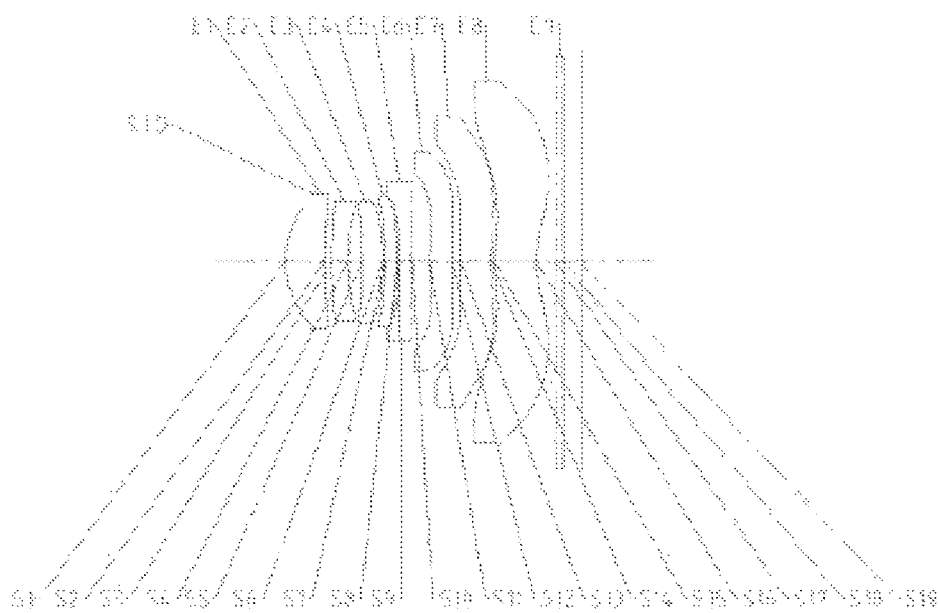
Fig. 1
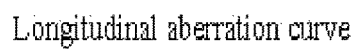
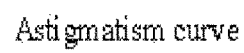
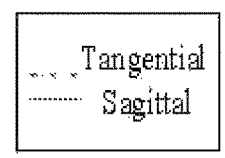
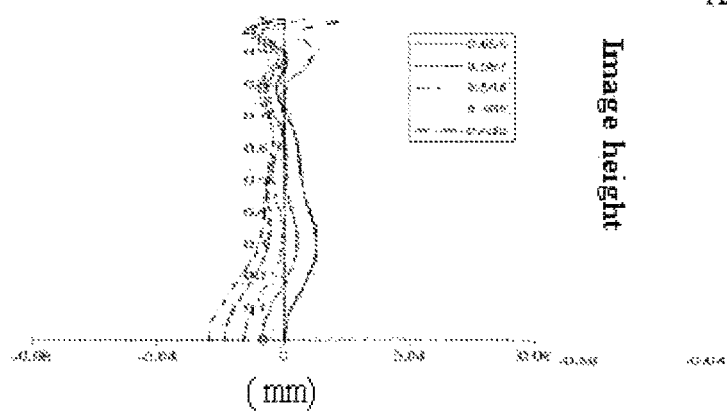
Fig. 2A              Fig. 2B
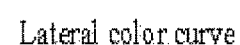
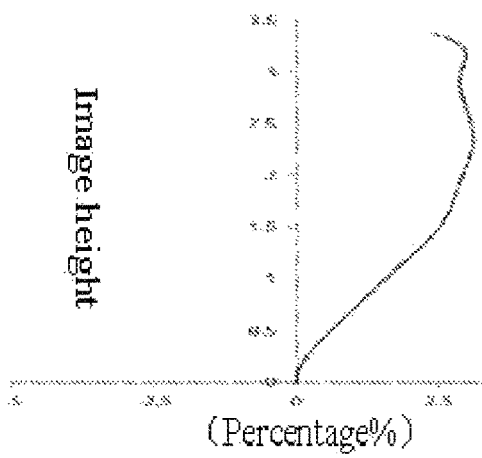
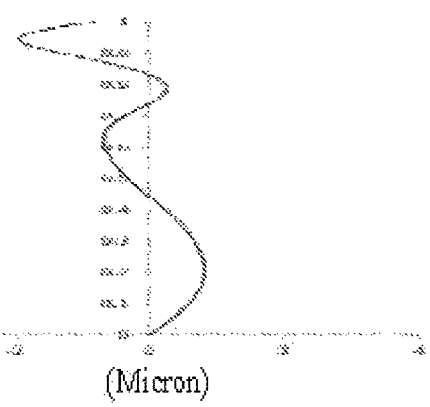
Fig. 2C              Fig. 2D

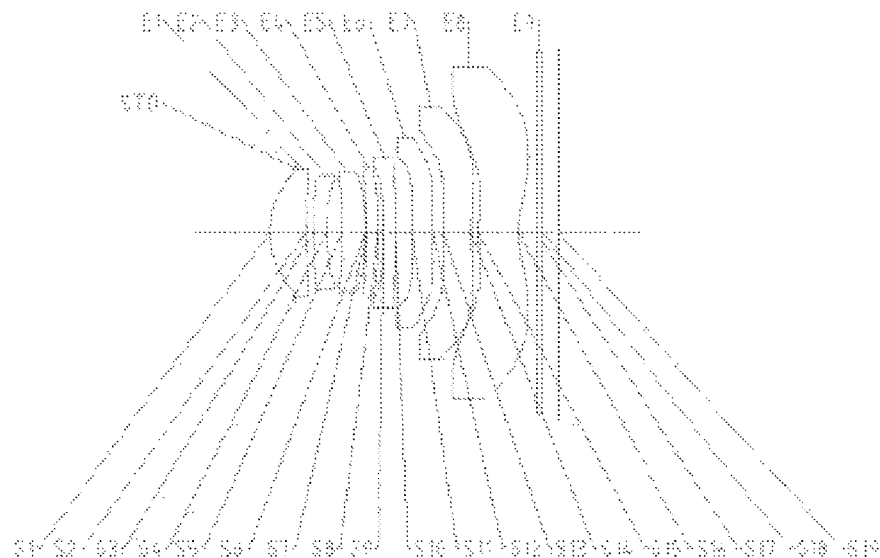
Fig. 19
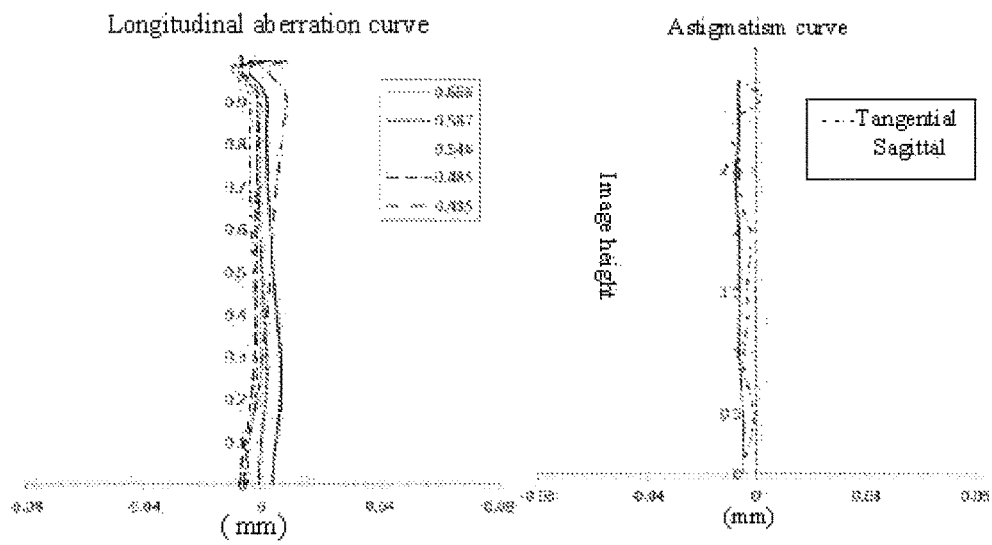
Fig. 20A
Fig. 20B
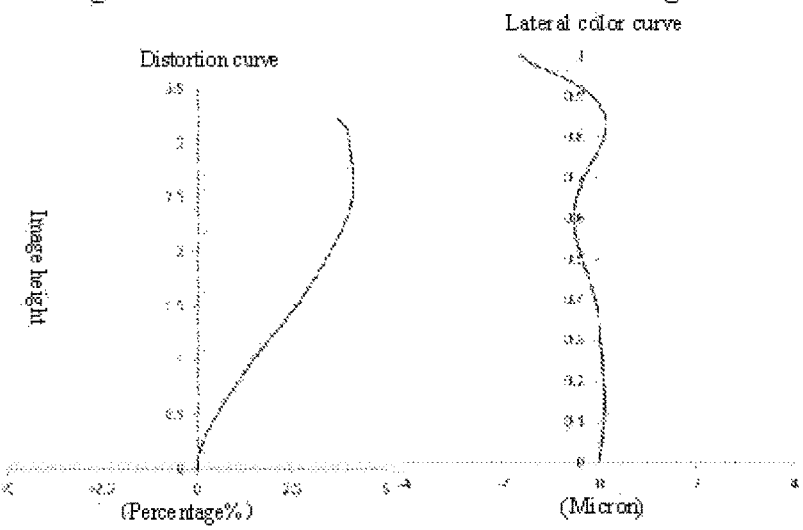
Fig. 20C
Fig. 20D

OPTICAL IMAGING LENS INCLUDING EIGHT LENSES OF +-++-+--, +-++--+-, +-++----, +-++-++-, +-+--+--, +-+-----, +-+-++-- +-+--++-, +-+-+++- OR +-+-+---REFRACTIVE POWERS

CROSS-REFERENCE TO RELATED APPLICATIONS

The present disclosure claims priority to Chinese Patent Application No. 201711172644.9, submitted to the State Intellectual Property Office (SIPO) on Nov. 22, 2017, and Chinese Patent Application No. 201721571215.4, submitted to the SIPO on Nov. 22, 2017, the contents of which are hereby incorporated by reference in their entirety.

TECHNICAL FIELD

The disclosure relates to an optical imaging lens, and more particularly to an optical imaging lens including eight lenses.

BACKGROUND

In recent years, along with rapid development of portable electronic products with an imaging function, requirements on miniature optical systems also increase. An imaging lens usually includes two main types of photosensitive elements, i.e., a Charge Coupled Device (CCD) or a Complementary Metal Oxide Semiconductor (CMOS). Along with the progress of semiconductor fabrication technologies, the number of pixels of a photosensitive element has increased and sizes of the pixels have been reduced, so that higher requirements are made to high imaging quality and miniaturization of a matched imaging lens.

Along with increase of requirements of miniature imaging lenses on pixels and imaging quality, imaging lenses have been gradually developed towards directions of large aperture, large viewing angle, wide imaging range and high resolution. An existing lens is unlikely to meet increasing requirements on both imaging quality and miniaturization, and providing an optical imaging lens with miniaturization, a large aperture and high imaging quality is a present advanced research direction.

SUMMARY

The disclosure provides an optical imaging lens, the optical imaging lens includes a first lens, a second lens, a third lens, a fourth lens, a fifth lens, a sixth lens, a seventh lens and an eighth lens, which are provided in sequence from an object side to an imaging side along an optical axis, the first lens has a positive refractive power, and an object-side surface of the first lens is a convex surface; the second lens has a negative refractive power; the third lens has a positive refractive power; the fourth lens has a positive refractive power or a negative refractive power, an object-side surface of the fourth lens is a concave surface and an imaging-side surface is a convex surface; the fifth lens has a positive refractive power or a negative refractive power; the sixth lens has a positive refractive power or a negative refractive power, and an object-side surface of the sixth lens is a convex surface; the seventh lens has a positive refractive power or a negative refractive power; and the eighth lens has a negative refractive power.

In some embodiments, a total effective focal length f of the optical imaging lens and an Entrance Pupil Diameter (EPD) of the optical imaging lens meet $f/EPD \leq 2.0$.

In some embodiments, a Total Track Length (TTL) and an ImgH meet $TTL/ImgH \leq 1.65$, the Total Track Length (TTL) is a distance from a center of the object-side surface of the first lens to an imaging surface of the optical imaging lens on the optical axis, the ImgH is a half of a diagonal length of an effective pixel region on the imaging surface of the optical imaging lens.

In some embodiments, a full Field Of View (FOV) of the optical imaging lens meets $70° \leq FOV \leq 81°$.

In some embodiments, an effective focal length f1 of the first lens and the total effective focal length f of the optical imaging lens meet $0.5 < f1/f < 1.0$.

In some embodiments, an effective focal length f2 of the second lens and the total effective focal length f of the optical imaging lens meet $-3.5 \leq f2/f \leq -1.5$.

In some embodiments, an effective focal length f3 of the third lens and the total effective focal length f of the optical imaging lens meet $1.5 \leq f3/f \leq 3.0$.

In some embodiments, an effective focal length f8 of the eighth lens and the total effective focal length f of the optical imaging lens meet $-5.0 \leq f8/f \leq -1.0$.

In some embodiments, a radius of curvature R3 of an object-side surface of the second lens and a radius of curvature R4 of an imaging-side surface of the second lens meet $1.5 \leq R3/R4 \leq 3.0$.

In some embodiments, a radius of curvature R1 of the object-side surface of the first lens and a radius of curvature R6 of an imaging-side surface of the third lens meet $-0.5 < R1/R6 < 0$.

In some embodiments, a center thickness CT3 of the third lens on the optical axis and a center thickness CT4 of the fourth lens on the optical axis meet $1.0 < CT3/CT4 < 2.5$.

In some embodiments, a radius of curvature R9 of an object-side surface of the fifth lens and a radius of curvature R11 of the object-side surface of the sixth lens meet $-2.5 < R9/R11 < 0$.

In some embodiments, a radius of curvature R15 of an object-side surface of the eighth lens and a radius of curvature R16 of an imaging-side surface of the eighth lens meet $(R15-R16)/(R15+R16) < 1.0$.

In some embodiments, a center thickness CT1 of the first lens on the optical axis and a center thickness CT2 of the second lens on the optical axis meet $2.0 < CT1/CT2 < 4.0$.

According to another aspect, the disclosure also provides an optical imaging lens, the optical imaging lens includes a first lens, a second lens, a third lens, a fourth lens, a fifth lens, a sixth lens, a seventh lens and an eighth lens which are provided in sequence from an object side to an imaging side along an optical axis, the first lens has a positive refractive power, and an object-side surface of the first is a convex surface; the second lens has a negative refractive power; the third lens has a positive refractive power; each of the fourth lens, the fifth lens and the seventh lens has a positive refractive power or a negative refractive power; the sixth lens has a positive refractive power or a negative refractive power, and an object-side surface of the sixth lens is a convex surface; the eighth lens has a negative refractive power; and a total effective focal length f of the optical imaging lens and an Entrance Pupil Diameter (EPD) of the optical imaging lens meet $f/EPD \leq 2.0$.

In some embodiments, an object-side surface of the second lens is a convex surface, and an imaging-side surface of the second lens is a concave surface.

In some embodiments, an imaging-side surface of the third lens is a convex surface.

In some embodiments, an object-side surface of the fourth lens is a concave surface, and an imaging-side surface is a convex surface.

In some embodiments, an object-side surface of the fifth lens is a concave surface.

BRIEF DESCRIPTION OF THE DRAWINGS

Detailed descriptions are made to unrestrictive embodiments below in combination with the drawings to make the other characteristics, purposes and advantages of the disclosure more apparent. In the drawings:

FIG. 1 is a structure diagram of an optical imaging lens according to embodiment 1 of the disclosure;

FIG. 2A to FIG. 2D illustrate a longitudinal aberration curve, an astigmatism curve, a distortion curve and a lateral color curve of an optical imaging lens according to embodiment 1 respectively;

FIG. 19 is a structure diagram of an optical imaging lens according to embodiment 10 of the disclosure;

FIG. 20A to FIG. 20D illustrate a longitudinal aberration curve, an astigmatism curve, a distortion curve and a lateral color curve of an optical imaging lens according to embodiment 10 respectively;

DETAILED DESCRIPTION OF THE EMBODIMENTS

Figure 3:
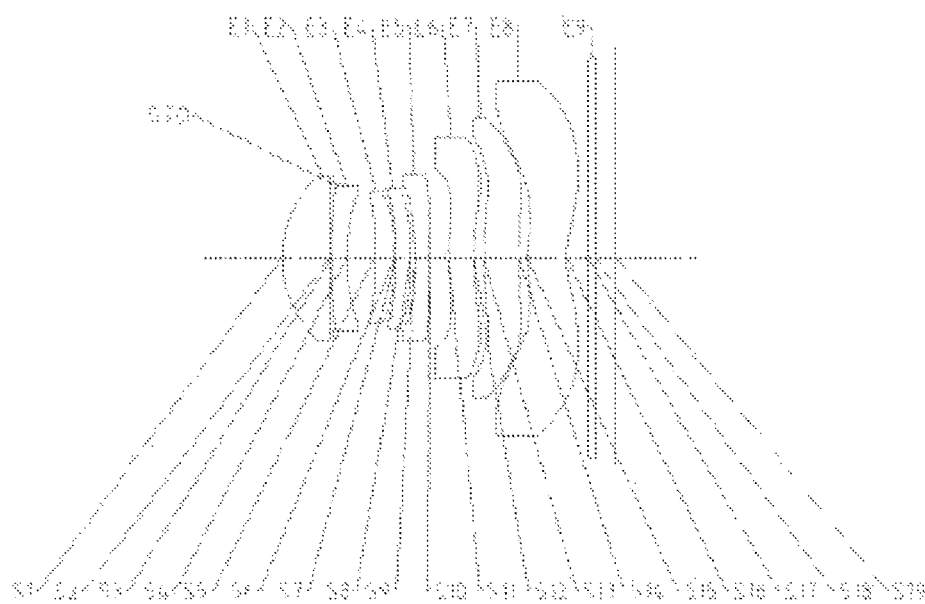
FIG. 3 is a structure diagram of an optical imaging lens according to embodiment 2 of the disclosure.

For understanding the disclosure better, more detailed descriptions will be made to each aspect of the disclosure with reference to the drawings. It is to be understood that these detailed descriptions are only descriptions about the embodiments of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the disclosure.

For convenient description, thicknesses, sizes and shapes of lenses are slightly magnified in the drawings. Specifically, spherical or aspheric shapes in the drawings are shown exemplarily. That is, spherical or aspheric shapes are not limited to the spherical or aspheric shapes shown in the drawings. The drawings are drawn only exemplarily but not strictly to scale.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to an object, in each lens is called an object-side surface, and a surface, closest to an imaging surface, in each lens is called an imaging-side surface.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the embodiments of the disclosure are described, "may" is used to represent "one or more embodiments of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments is combined without conflicts. The disclosure will be described below with reference to the drawings and in combination with the embodiments in detail.

The characteristics, principles and other aspects of the disclosure will be described below in detail.

An optical imaging lens according to some embodiments of the disclosure includes, for example, eight lenses with a refractive power, i.e., a first lens, a second lens, a third lens, a fourth lens, a fifth lens, a sixth lens, a seventh lens and an eighth lens. The eight lenses are provided in sequence from an object side to an imaging side along an optical axis.

In some embodiments, the first lens has a positive refractive power, and an object-side surface of is a convex surface; the second lens has a negative refractive power; the third lens has a positive refractive power; the fourth lens has a positive refractive power or a negative refractive power, an object-side surface of the fourth lens is a concave surface and an imaging-side surface is a convex surface; the fifth lens has a positive refractive power or a negative refractive power; the sixth lens has a positive refractive power or a negative refractive power, and an object-side surface of the sixth lens is a convex surface; the seventh lens has a positive refractive power or a negative refractive power; and the eighth lens has a negative refractive power.

In the embodiments, an object-side surface of the second lens is a convex surface, and an imaging-side surface is a concave surface.

In the embodiments, at least one of an object-side surface and imaging-side surface of the third lens is a convex surface. For example, the imaging-side surface of the third lens is a convex surface.

In the embodiments, at least one of an object-side surface and imaging-side surface of the fifth lens is a concave surface. For example, the object-side surface of the fifth lens is a concave surface.

In the embodiments, at least one of an object-side surface and imaging-side surface of the seventh lens is a concave surface. For example, the imaging-side surface of the seventh lens is a concave surface.

In the embodiments, an object-side surface of the eighth lens is a convex surface, and an imaging-side surface is a concave surface.

In the embodiments, the optical imaging lens of the disclosure meets a conditional expression $f/EPD \leq 2.0$, and f is a total effective focal length of the optical imaging lens, and EPD is an entrance pupil diameter of the optical imaging lens. More specifically, f and EPD further meet $1.55 \leq f/EPD \leq 1.90$. Meeting the conditional expression $f/EPD \leq 2.0$ can effectively increase a luminous flux within a unit time to endow the optical imaging lens with the advantage of large aperture, so that an aberration of a marginal FOV is reduced, and meanwhile, an imaging effect in a dark environment is enhanced.

In the embodiments, the optical imaging lens of the disclosure meets a conditional expression $TTL/ImgH \leq 1.65$, the TTL is a distance from a center of the object-side surface of the first lens to an imaging surface of the optical imaging lens on the optical axis, and an ImgH is a half of a diagonal length of an effective pixel region on the imaging surface of the optical imaging lens. More specifically, the TTL and the ImgH further meet $1.41 \leq TTL/ImgH \leq 1.63$. A ratio of the TTL to the ImgH is controlled to ensure a miniaturization characteristic of the optical imaging lens.

In the embodiments, the optical imaging lens of the disclosure meets a conditional expression $70° \leq FOV \leq 81°$, and full FOV is a full Field Of View of the optical imaging lens. More specifically, FOV further meets $70.5° \leq FOV \leq 80.4°$. The FOV of the lens is controlled to effectively control an imaging range of the lens.

In the embodiments, the optical imaging lens of the disclosure meets a conditional expression $0.5 < f1/f < 1.0$, f1 is an effective focal length of the first lens, and f is the total effective focal length of the optical imaging lens. More specifically, f1 and f further meet $0.65 < f1/f < 0.95$, for example, $0.72 \leq f1/f \leq 0.91$. Meeting the conditional expression $0.5 < f1/f < 1.0$ can endow an object-side end with a proper convergence capability to regulate a beam convergence position and further reduce a total optical length of an imaging system.

In the embodiments, the optical imaging lens of the disclosure meets a conditional expression $-3.5 \leq f2/f \leq -1.5$, f2 is an effective focal length of the second lens, and f is the total effective focal length of the optical imaging lens. More specifically, f2 and f further meet $-3.30 \leq f2/f \leq -1.56$. As those skilled in the art know, spherical aberration is one of most important factors restricting a resolution of a lens. In the disclosure, the lenses with the negative refractive powers are reasonably introduced, so that a spherical aberration of the imaging system is effectively balanced, and imaging quality is improved.

In the embodiments, the optical imaging lens of the disclosure meets a conditional expression $1.5 \leq f3/f \leq 3.0$, f3 is an effective focal length of the third lens, and f is the total effective focal length of the optical imaging lens. More specifically, f3 and f further meet $1.70 \leq f3/f \leq 2.70$, for example, $1.84 \leq f3/f \leq 2.59$. The refractive power of the third lens is controlled to effectively reduce tolerance sensitivity of the imaging system and ensure miniaturization of the imaging system.

In the embodiments, the optical imaging lens of the disclosure meets a conditional expression $-5.0 \leq f8/f \leq -1.0$, f8 is an effective focal length of the eighth lens, and f is the total effective focal length of the optical imaging lens. More specifically, f8 and f further meet $-4.82 \leq f8/f \leq -1.10$. The refractive power of the eighth lens is controlled to effectively correct a distortion at a paraxial region of an image surface, thereby improving the imaging quality of the imaging system.

In the embodiments, the optical imaging lens of the disclosure meets a conditional expression 1.5≤R3/R4≤3.0, R3 is a radius of curvature of the object-side surface of the second lens, and R4 is a radius of curvature of the imaging-side surface of the second lens. More specifically, R3 and R4 further meet 1.64≤R3/R4≤2.93. Meeting the conditional expression 1.5≤R3/R4≤3.0 is favorable for reducing the spherical aberration and astigmatism of the imaging system.

In the embodiments, the optical imaging lens of the disclosure meets a conditional expression −0.5<R1/R6<0, R1 is a radius of curvature of the object-side surface of the first lens, and R6 is a radius of curvature of the imaging-side surface of the third lens. More specifically, R1 and R6 further meet −0.40<R1/R6<−0.20, for example, −0.32≤R1/R6≤−0.24. Matching the first lens and the third lens and meeting the conditional expression −0.5<R1/R6<0 can effectively correct a chromatic aberration of the imaging system and are favorable for balancing various aberrations.

In the embodiments, the optical imaging lens of the disclosure meets a conditional expression 1.0<CT3/CT4<2.5, CT3 is a center thickness of the third lens on the optical axis, and CT4 is a center thickness of the fourth lens on the optical axis. More specifically, CT3 and CT4 further meet 1.30<CT3/CT4<2.45, for example, 1.38≤CT3/CT4≤2.40. Meeting the conditional expression 1.0<CT3/CT4<2.5 is favorable for uniform distribution of a size of the lens and ensuring assembling stability and is also favorable for reducing the aberration of the whole imaging system and reducing the total optical length of the imaging system.

In the embodiments, the optical imaging lens of the disclosure meets a conditional expression −2.5<R9/R11<0, R9 is a radius of curvature of the object-side surface of the fifth lens, and R11 Is a radius of curvature of the imaging-side surface of the sixth lens. More specifically, R1 and R6 further meet −2.10<R9/R11<−0.30, for example, −2.02≤R9/R11≤−0.41. Matching the fifth lens and the sixth lens and meeting the conditional expression −2.5<R9/R11<0 can effectively correct the chromatic aberration of the imaging system and are favorable for balancing various aberrations.

In the embodiments, the optical imaging lens of the disclosure meets a conditional expression (R15−R16)/(R15+R16)<1.0, R15 is a radius of curvature of the object-side surface of the eighth lens, and R16 is a radius of curvature of the imaging-side surface of the eighth lens. More specifically, R1 and R6 further meet 0.10<(R15−R16)/(R15+R16)<0.65, for example, 0.16≤(R15−R16)/(R15+R16)≤0.56. A ratio of the radius of curvature of the object-side surface and the radius of curvature of the imaging-side surface of the eighth lens is controlled to effectively correct the overall aberration of the imaging system.

In the embodiments, the optical imaging lens of the disclosure meets a conditional expression 2.0<CT1/CT2<4.0, e CT1 is a center thickness of the first lens on the optical axis, and CT2 is a center thickness of the second lens on the optical axis. More specifically, CT1 and CT2 further meet 2.30<CT1/CT2<3.60, for example, 2.39≤CT1/CT2≤3.56. A ratio of the center thicknesses of the first lens and the center thicknesses of the second lens is controlled to achieve high manufacturability of the imaging system.

In the embodiments, the optical lens further includes at least one diaphragm to improve the imaging quality of the lens. The diaphragm is arranged at any position according to a requirement. For example, the diaphragm is arranged between the object side and the first lens; or, the diaphragm is arranged between the first lens and the second lens.

Optionally, the optical lens further includes an optical filter configured to correct color deviation and/or protective glass configured to protect a photosensitive element on the imaging surface.

The optical imaging lens according to the embodiments of the disclosure may adopt multiple lenses, for example, the abovementioned eight. A refractive power of each lens, a surface type, a center thickness of each lens, on-axis distances between the lenses and the like are reasonably configured to effectively reduce the size of the imaging lens, reduce sensitivity of the imaging lens, improve manufacturability of the imaging lens and ensure that the optical imaging lens is more favorable for production and machining and is applied to a portable electronic product. Meanwhile, the optical imaging lens with the above configuration is further endowed with the beneficial effects of, for example, large aperture, large viewing angle and high imaging quality.

In the embodiments of the disclosure, at least one of mirror surfaces of the lenses is an aspheric mirror surface. The aspheric mirror surface has the characteristic that the curvature keeps changing from a center of the lens to a periphery of the lens. Unlike a spherical lens with a constant curvature from a center of the lens to a periphery of the lens, an aspheric lens has a better radius of curvature characteristic and the advantages of improving distortion and improving astigmatic aberrations. With adoption of the aspheric lens, the astigmatic aberrations during imaging is eliminated as much as possible, thereby improving the imaging quality.

However, those skilled in the art should know that the number of the lenses forming the optical imaging lens is changed without departing from the technical solutions claimed in the disclosure to achieve each result and advantage described in the specification. For example, although descriptions are made in the embodiments with eight lenses as an example, the optical imaging lens is not limited to eight lenses. If necessary, the optical imaging lens further includes another number of lenses.

Specific embodiments of the optical imaging lens applied to the abovementioned embodiments will further be described below with reference to the drawings.

Embodiment 1

An optical imaging lens according to embodiment 1 of the disclosure will be described below with reference to FIG. 1 to FIG. 2D. FIG. 1 is a structure diagram of an optical imaging lens according to embodiment 1 of the disclosure.

As shown in FIG. 1, the optical imaging lens according to the embodiment of the disclosure includes a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a concave surface. The sixth lens E6 has a positive refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light torn an object sequentially penetrates through each of the surfaces S1 to S18 and is finally image on the imaging surface S19.

Table 1 shows the surface type, the radius of curvature, the thickness, the material and conic coefficient of each lens of the optical imaging lens according to embodiment 1. Units of the radius of curvature and the thickness are millimeter (mm)

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.4604 | | | |
| S1 | Aspheric | 1.5106 | 0.6244 | 1.55 | 56.1 | 0.0229 |
| S2 | Aspheric | 6.2560 | 0.1170 | | | −92.0713 |
| S3 | Aspheric | 5.1329 | 0.2615 | 1.67 | 20.4 | −85.8704 |
| S4 | Aspheric | 3.1380 | 0.2275 | | | 5.9921 |
| S5 | Aspheric | 78.2561 | 0.3295 | 1.55 | 56.1 | −99.0000 |
| S6 | Aspheric | −5.8826 | 0.0341 | | | 28.3414 |
| S7 | Aspheric | −8.6217 | 0.2000 | 1.65 | 23.5 | 69.8169 |
| S8 | Aspheric | −8.1980 | 0.0332 | | | 54.7227 |
| S9 | Aspheric | −9.6048 | 0.2000 | 1.66 | 21.5 | 75.8683 |
| S10 | Aspheric | 33.0494 | 0.2834 | | | 95.8294 |
| S11 | Aspheric | 8.0465 | 0.3612 | 1.67 | 20.4 | −27.7136 |
| S12 | Aspheric | 23.4844 | 0.1341 | | | 11.3743 |
| S13 | Aspheric | 138.3482 | 0.4896 | 1.66 | 21.5 | −99.0000 |
| S14 | Aspheric | 8.2874 | 0.0518 | | | −99.0000 |
| S15 | Aspheric | 2.6548 | 0.6776 | 1.54 | 55.7 | −18.3355 |
| S16 | Aspheric | 1.6684 | 0.3134 | | | −0.7811 |
| S17 | Spherical | Infinite | 0.1100 | 1.52 | 64.2 | |
| S18 | Spherical | Infinite | 0.2917 | | | |
| S19 | Spherical | Infinite | | | | |

From Table 1, it can be seen that both the object-side surface and imaging-side surface of any lens in the first lens E1 to the eighth lens E8 are aspheric surfaces. In the embodiment, the surface type x of each aspheric lens is defined by use of, but not limited to, the following aspheric surface formula:

$$x = \frac{ch^2}{1+\sqrt{1-(k+1)c^2h^2}} + \Sigma Aih', \quad (1)$$

Here, x is the sag—the axis-component of the displacement of the surface from the aspheric vertex, when the surface is at a height h from the optical axis; c is a paraxial curvature of the aspheric surface, c=1/R (namely, the paraxial curvature c is a reciprocal of the radius of curvature R in Table 1); k is the conic coefficient (given in Table 1); and Ai is the correction coefficient of the $i^{th}$ order of aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S16 in embodiment 1.

TABLE 2

| Surface number | A4 | A6 | A8 | A10 | A12 |
|---|---|---|---|---|---|
| S1 | −9.4000E−04 | 1.1763E−02 | −1.7520E−02 | −1.4200E−03 | 8.2919E−02 |
| S2 | −1.7600E−03 | −3.4190E−02 | 1.7654E−01 | −3.7752E−01 | 4.6453E−01 |
| S3 | −3.8990E−02 | 2.0639E−02 | −1.1509E−01 | 6.9169E−01 | −1.5734E+00 |
| S4 | −9.2160E−02 | 4.2927E−02 | 3.6645E−02 | −4.2574E−01 | 2.2788E+00 |

TABLE 2-continued

| | | | | | |
|---|---|---|---|---|---|
| S5 | −1.7650E−02 | −2.7970E−01 | 1.6017E+00 | −8.3204E+00 | 2.6248E+01 |
| S6 | 7.3206E−02 | −5.0232E−01 | 2.0110E+00 | −6.2323E+00 | 1.1481E+01 |
| S7 | −3.0430E−02 | 2.0176E−02 | −5.0720E−02 | −1.1070E−02 | 2.4718E−01 |
| S8 | −2.4144E−01 | 1.5356E+00 | −5.4869E+00 | 1.0839E+01 | −1.2543E+01 |
| S9 | −2.3795E−01 | 1.6331E+00 | −5.7273E+00 | 1.1467E+01 | −1.4880E+01 |
| S10 | −9.8340E−02 | 2.2745E−01 | −4.3919E−01 | 5.0111E−01 | −2.8501E−01 |
| S11 | −1.3370E−02 | −9.4610E−02 | 7.9643E−02 | −7.1290E−02 | 5.3509E−02 |
| S12 | 4.5723E−02 | −9.2130E−02 | 3.4379E−02 | 4.0500E−04 | −2.8100E−03 |
| S13 | 5.8190E−02 | −1.2056E−01 | 7.1947E−02 | −2.4060E−02 | 3.0680E−03 |
| S14 | 4.3939E−02 | −8.5760E−02 | 5.0509E−02 | −1.7570E−02 | 3.4020E−03 |
| S15 | −1.0165E−01 | −9.3000E−04 | 2.3910E−02 | −1.1240E−02 | 2.6120E−03 |
| S16 | −2.0674E−01 | 9.6979E−02 | −3.9570E−02 | 1.1180E−02 | −2.0100E−03 |

| Surface number | A14 | A16 | A18 | A20 |
|---|---|---|---|---|
| S1 | −1.6444E−01 | 1.4877E−01 | −6.5280E−02 | 1.1060E−02 |
| S2 | −3.3829E−01 | 1.4241E−01 | −3.1860E−02 | 2.9180E−03 |
| S3 | 1.8814E+00 | −1.2158E+00 | 3.9780E−01 | −5.1610E−02 |
| S4 | −7.2929E+00 | 1.3286E+01 | −1.2613E+01 | 4.9079E+00 |
| S5 | −5.2322E+01 | 6.4090E+01 | −4.3900E+01 | 1.2971E+01 |
| S6 | −1.2982E+01 | 9.1012E+00 | −3.6223E+00 | 6.1903E−01 |
| S7 | −3.1954E−01 | 1.7375E−01 | −4.4280E−02 | 4.3630E−03 |
| S8 | 8.6662E+00 | −3.5047E+00 | 7.6368E−01 | −6.9100E−02 |
| S9 | 1.3340E+01 | −8.3333E+00 | 3.2992E+00 | −6.1844E−01 |
| S10 | 5.8732E−02 | 1.1763E−02 | −7.1900E−03 | 8.8300E−04 |
| S11 | −2.4010E−02 | 5.3350E−03 | −4.2000E−04 | 0.0000E+00 |
| S12 | −1.8000E−04 | 3.3600E−04 | −5.1000E−05 | 0.0000E+00 |
| S13 | 6.9000E−04 | −2.6000E−04 | 2.2200E−05 | 0.0000E+00 |
| S14 | −2.9000E−04 | 1.7700E−07 | 9.6800E−07 | 0.0000E+00 |
| S15 | −3.4000E−04 | 2.3500E−05 | −6.8000E−07 | 0.0000E+00 |
| S16 | 2.1800E−04 | −1.3000E−05 | 3.1900E−07 | 0.0000E+00 |

Table 3 shows effective focal lengths f1 to f8 of the lenses in embodiment 1, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 3

| f1(mm) | 3.48 | f7(mm) | −13.42 |
|---|---|---|---|
| f2(mm) | −12.76 | f8(mm) | −11.00 |
| f3(mm) | 10.03 | f(mm) | 3.87 |
| f4(mm) | 218.23 | TTL(mm) | 4.74 |
| f5(mm) | −11.29 | ImgH(mm) | 3.37 |
| f6(mm) | 18.17 | FOV(°) | 80.4 |

The optical imaging lens in embodiment 1 meets:

f/EPD=1.79, where f is a total effective focal length f of the optical imaging lens and EPD is an entrance pupil diameter of the optical imaging lens;

TTL/ImgH=1.41, where TTL is the distance from the center of the object-side surface S1 of the first lens S1 to the imaging surface S19 on the optical axis, and ImgH is a half of the diagonal length of the effective pixel region on the imaging surface S19;

f1/f=0.90, where f1 is an effective focal length of the first lens E1, and f is the total effective focal length of the optical imaging lens;

f2/f=−3.30, where f2 is an effective focal length of the second lens E2, and f is the total effective focal length of the optical imaging lens;

f3/f=2.59, where f3 is an effective focal length of the third lens E3, and f is the total effective focal length of the optical imaging lens;

f8/f=−2.84, where f8 is an effective focal length of the eighth lens E8, and f is the total effective focal length of the optical imaging lens;

R3/R4=1.64, where R3 is a radius of curvature of the object-side surface S3 of the second lens E2, and R4 is a radius of curvature of the imaging-side surface S4 of the second lens E2;

R1/R6=−0.26, where R1 is a radius of curvature of the object-side surface S1 of the first lens E1, and R6 is a radius of curvature of the imaging-side surface S6 of the third lens E3;

CT3/CT4=1.65, where CT3 is a center thickness of the third lens E3 on the optical axis, and CT4 is a center thickness of the fourth lens E4 on the optical axis;

R9/R11=−1.19, where R9 is a radius of curvature of the object-side surface S9 of the fifth lens E5, and R11 is a radius of curvature of the object-side surface S11 of the sixth lens E6;

(R15−R16)/(R15+R16)=0.23, where R15 is a radius of curvature of the object-side surface S15 of the eighth lens E8, and R16 is a radius of curvature of the imaging-side surface S16 of the eighth lens E8; and CT1/CT2=2.39, where CT1 is a center thickness of the first lens E1 on the optical axis, and CT2 is a center thickness of the second lens E2 on the optical axis.

In addition, FIG. 2A illustrates a longitudinal aberration curve of the optical imaging lens according to embodiment 1 to represent deviation of a convergence focal point after light with different wavelengths passes through the lens. FIG. 2B illustrates an astigmatism curve of the optical imaging lens according to embodiment 1 to represent a tangential image surface curvature and a sagittal image surface curvature. FIG. 2C illustrates a distortion curve of the optical imaging lens according to embodiment 1 to represent a distortion value under different viewing angles. FIG. 2D illustrates a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 can achieve high imaging quality.

Embodiment 2

An optical imaging lens according to embodiment 2 of the disclosure will be described below with reference to FIG. 3 to FIG. 4D. In the embodiment and the following embodiments, part of descriptions similar to those about embodiment 1 are omitted for simplicity. FIG. 3 is a structure diagram of an optical imaging lens according to embodiment 2 of the disclosure.

As shown in FIG. 3, the optical imaging lens according to the embodiment of the disclosure includes a first lens E1, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a convex surface. The sixth lens E6 has a negative refractive power, an object-side surface S11 of the sixth lens is a convex surface, and an imaging-side surface S12 of the sixth lens is a concave surface. The seventh lens E7 has a positive refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface 17 and an imaging-side surface S17. Light from an object sequentially penetrates through each of the surfaces S4 to S18 and is finally image on the imaging surface 19.

Table 4 shows the surface type, radius of curvature, the thickness, the material and conic coefficient of each lens of the optical imaging lens according to embodiment 2. Units of the radius of curvature and the thickness are millimeter (mm).

TABLE 4

| Surface number | Surface type | Radius of curvature | Thickness | Refractive index | Abbe number | Conic coefficient |
|---|---|---|---|---|---|---|
| OBJ | Spherical | Infinite | Infinite | | | |
| S1 | Aspheric | 1.8338 | 0.7700 | 1.55 | 56.1 | −0.0639 |
| S2 | Aspheric | 58.5075 | 0.0700 | | | −56.1091 |
| STO | Spherical | Infinite | −0.0367 | | | 0.0000 |
| S3 | Aspheric | 7.9170 | 0.2480 | 1.65 | 23.5 | −70.6432 |
| S4 | Aspheric | 3.1517 | 0.4481 | | | 4.4587 |
| S5 | Aspheric | 50.1710 | 0.3283 | 1.55 | 56.1 | −99.0000 |
| S6 | Aspheric | −6.1349 | 0.0256 | | | 23.1820 |
| S7 | Aspheric | −9.0427 | 0.2387 | 1.55 | 56.1 | 53.5095 |
| S8 | Aspheric | −8.7437 | 0.0724 | | | 47.9762 |
| S9 | Aspheric | −6.6008 | 0.2392 | 1.66 | 21.5 | −93.2381 |
| S10 | Aspheric | −28.3596 | 0.3031 | | | 99.0000 |
| S11 | Aspheric | 6.2815 | 0.4048 | 1.55 | 56.1 | −20.3423 |
| S12 | Aspheric | 4.5123 | 0.1578 | | | −26.5637 |
| S13 | Aspheric | 6.6387 | 0.5719 | 1.65 | 23.5 | −3.5022 |
| S14 | Aspheric | 9.4187 | 0.1407 | | | −99.0000 |
| S15 | Aspheric | 2.8866 | 0.6364 | 1.54 | 55.7 | −18.2402 |
| S16 | Aspheric | 1.6959 | 0.3515 | | | −0.8295 |
| S17 | Spherical | Infinite | 0.1155 | 1.52 | 64.2 | |
| S18 | Spherical | Infinite | 0.3288 | | | |
| S19 | Spherical | Infinite | | | | |

From Table 4, it can be seen that, in embodiment 2, both the object-side surface and imaging-side surface of any lens in the first lens E1 to the eighth lens E8 are aspheric surfaces. Table 5 shows higher-order coefficients applied to each aspheric mirror surface in embodiment 2. The surface type of each aspheric surface is defined by formula (1) given in embodiment 1.

TABLE 5

| Surface number | A4 | A6 | A8 | A10 | A12 |
|---|---|---|---|---|---|
| S1 | 4.5900E−04 | 7.0170E−03 | −1.4940E−02 | 1.3971E−02 | 4.4250E−03 |
| S2 | −3.1680E−02 | 9.4563E−02 | −1.4831E−01 | 1.3440E−01 | −4.9920E−02 |
| S3 | −5.4250E−02 | 1.1418E−01 | −1.7162E−01 | 2.1217E−01 | −1.9315E−01 |
| S4 | −6.3420E−02 | 2.7360E−02 | −8.3400E−03 | 1.7270E−02 | −1.0109E−01 |
| S5 | −3.4060E−02 | −8.5870E−02 | 1.5314E−02 | 3.7141E−01 | −1.4721E+00 |
| S6 | 1.7049E−01 | −8.1119E−01 | 9.7991E−01 | −2.6757E−01 | −4.7872E−01 |
| S7 | 1.4509E−01 | −6.3055E−01 | 4.4054E−01 | 7.0957E−01 | −1.2692E+00 |

TABLE 5-continued

| | | | | | |
|---|---|---|---|---|---|
| S8 | −2.1533E−01 | 7.8195E−01 | −1.7842E+00 | 2.2551E+00 | −1.5665E+00 |
| S9 | −2.5559E−01 | 9.9844E−01 | −2.1530E+00 | 2.6474E+00 | −2.0554E+00 |
| S10 | −7.6720E−02 | 3.7066E−01 | −7.7486E−01 | 8.8625E−01 | −6.0014E−01 |
| S11 | −5.1030E−02 | 7.3904E−02 | −1.7190E−01 | 2.2408E−01 | −1.9478E−01 |
| S12 | 5.7077E−02 | −1.3412E−01 | 1.3197E−01 | −8.4220E−02 | 3.3763E−02 |
| S13 | 8.5567E−02 | −1.7959E−01 | 1.5638E−01 | −9.4430E−02 | 3.7044E−02 |
| S14 | 4.6062E−02 | −8.7780E−02 | 5.7990E−02 | −2.5740E−02 | 7.0650E−03 |
| S15 | −1.0591E−01 | −2.5270E−02 | 4.5853E−02 | −2.1290E−02 | 5.3500E−03 |
| S16 | −1.8874E−01 | 7.6906E−02 | −2.7650E−02 | 7.4310E−03 | −1.3300E−03 |

| Surface number | A14 | A16 | A18 | A20 |
|---|---|---|---|---|
| S1 | −2.4110E−02 | 2.2876E−02 | −9.6300E−03 | 1.4970E−03 |
| S2 | −2.7880E−02 | 3.8599E−02 | −1.5950E−02 | 2.3870E−03 |
| S3 | 1.3748E−01 | −7.6790E−02 | 2.9472E−02 | −5.2100E−03 |
| S4 | 2.4995E−01 | −2.8539E−01 | 1.5686E−01 | −3.1700E−02 |
| S5 | 2.7737E+00 | −2.8223E+00 | 1.5013E+00 | −3.2680E−01 |
| S6 | 7.4366E−01 | −7.6410E−01 | 5.0500E−01 | −1.3599E−01 |
| S7 | 8.1107E−01 | −4.6451E−01 | 3.1980E−01 | −9.9250E−02 |
| S8 | 6.5976E−01 | −3.5650E−01 | 2.3189E−01 | −6.2270E−02 |
| S9 | 1.1949E+00 | −6.6783E−01 | 3.0216E−01 | −6.3760E−02 |
| S10 | 2.3265E−01 | −4.2790E−02 | 3.3700E−04 | 7.2500E−04 |
| S11 | 1.0377E−01 | −3.0930E−02 | 3.9100E−03 | 0.0000E+00 |
| S12 | −8.2000E−03 | 1.1030E−03 | −6.3000E−05 | 0.0000E+00 |
| S13 | −8.6400E−03 | 1.0780E−03 | −5.5000E−05 | 0.0000E+00 |
| S14 | −1.0700E−03 | 7.7600E−05 | −1.8000E−06 | 0.0000E+00 |
| S15 | −7.8000E−04 | 6.1400E−05 | −2.0000E−06 | 0.0000E+00 |
| S16 | 1.4400E−04 | −8.5000E−06 | 2.0800E−07 | 0.0000E+00 |

Table 6 shows effective focal lengths f1 to f8 of the lenses in embodiment 2, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 6

| f1(mm) | 3.45 | f7(mm) | 32.27 |
|---|---|---|---|
| f2(mm) | −8.29 | f8(mm) | −9.41 |
| f3(mm) | 10.02 | f(mm) | 4.46 |
| f4(mm) | 377.36 | TTL(mm) | 5.41 |
| f5(mm) | −13.13 | ImgH(mm) | 3.40 |
| f6(mm) | −31.89 | FOV(°) | 73.3 |

Figure 4A:
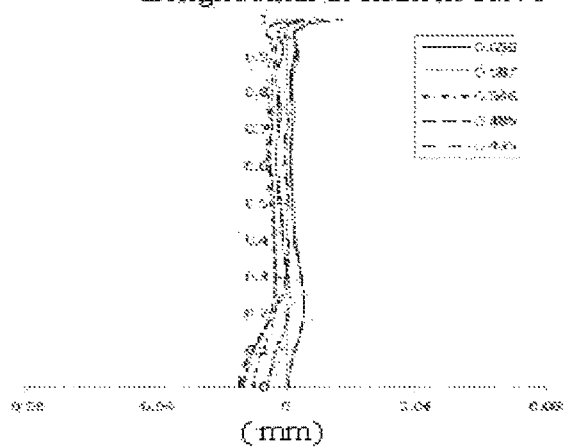
FIG. 4A to FIG. 4D illustrate a longitudinal aberration curve, an astigmatism curve, a distortion curve and a lateral color curve of an optical imaging lens according to embodiment 2 respectively.
Figure 4B:
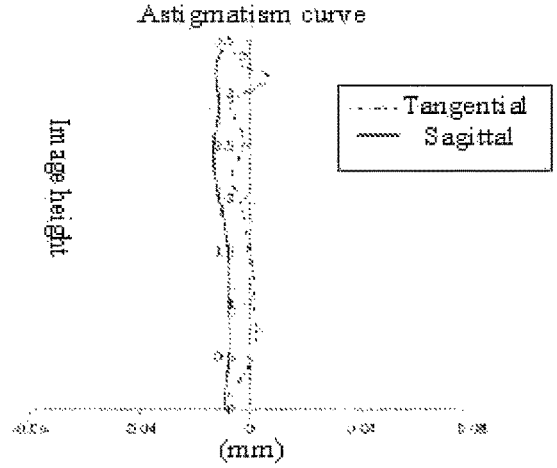
Figure 4C:
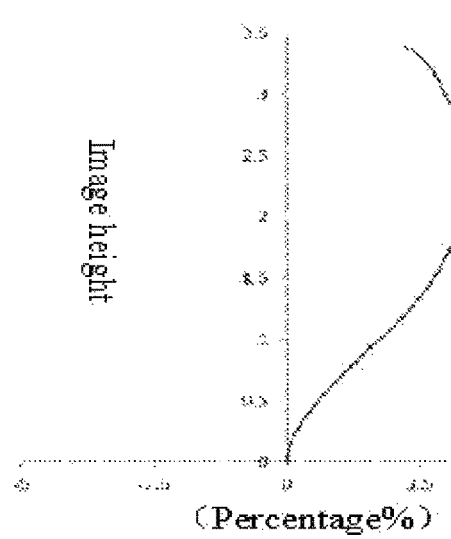
Figure 4D:
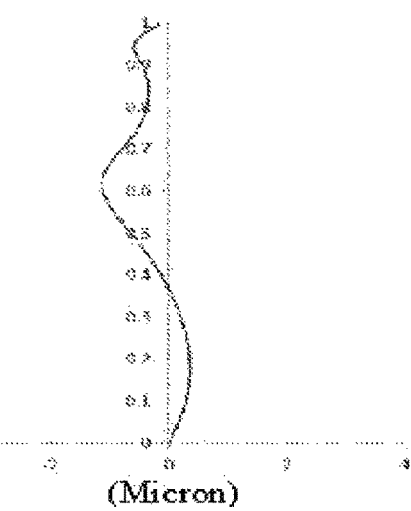

FIG. 4A illustrates a longitudinal aberration curve of the optical imaging lens according to embodiment 2 to represent deviation of a convergence focal point after light with different wavelengths passes through the lens. FIG. 4B illustrates an astigmatism curve of the optical imaging lens according to embodiment 2 to represent a tangential image surface curvature and a sagittal image surface curvature. FIG. 4C illustrates a distortion curve of the optical imaging lens according to embodiment 2 to represent a distortion value under different viewing angles. FIG. 4D illustrates a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 can achieve high imaging quality.

Embodiment 3

Figure 5:
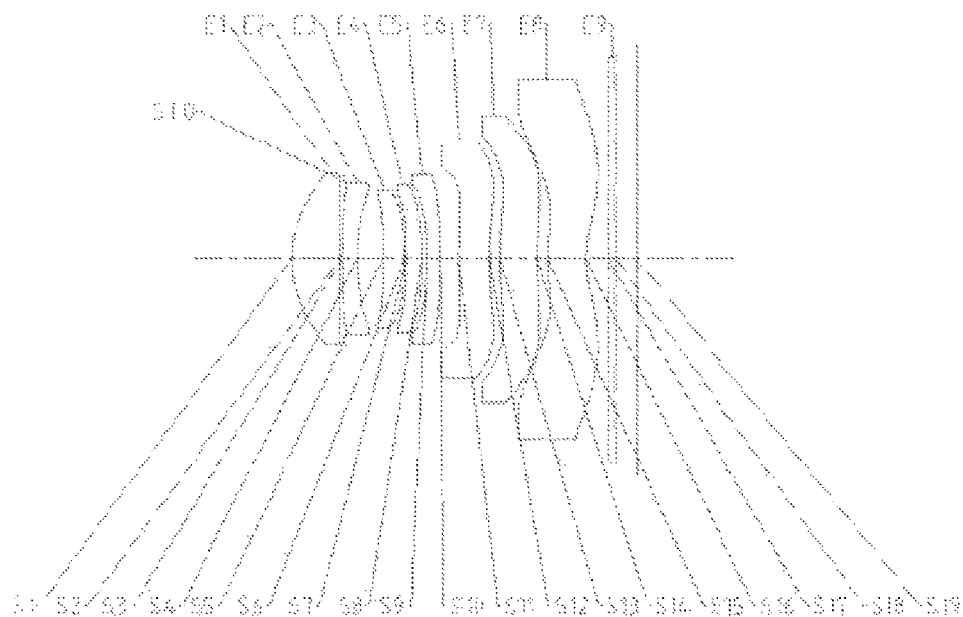
FIG. 5 is a structure diagram of an optical imaging lens according to embodiment 3 of the disclosure.

An optical imaging lens according to embodiment 3 of the disclosure is described below with reference to FIG. 5 to FIG. 6D. FIG. 5 is a structure diagram of an optical imaging lens according to embodiment 3 of the disclosure.

As shown in FIG. 5, the optical imaging lens according to the embodiment of the disclosure a first lens E1, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a convex surface. The sixth lens E6 has a negative refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 7 shows the surface type, the radius of curvature, the thickness, the material and conic coefficient of each lens of the optical imaging lens according to embodiment 3. Units of the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 1.8547 | 0.7500 | 1.55 | 56.1 | −0.0974 |
| S2 | Aspheric | 76.7835 | 0.0677 | | | 17.2968 |
| STO | Spherical | Infinite | −0.0308 | | | 0.0000 |
| S3 | Aspheric | 8.1191 | 0.2353 | 1.65 | 23.5 | −80.9541 |
| S4 | Aspheric | 3.1246 | 0.3923 | | | 4.0993 |
| S5 | Aspheric | 41.8652 | 0.3522 | 1.55 | 56.1 | 99.0000 |
| S6 | Aspheric | −5.9251 | 0.0252 | | | 23.7949 |
| S7 | Aspheric | −8.7429 | 0.2398 | 1.55 | 56.1 | 48.0767 |
| S8 | Aspheric | −8.6479 | 0.0835 | | | 45.5406 |
| S9 | Aspheric | −5.8262 | 0.2034 | 1.66 | 21.5 | −54.1860 |
| S10 | Aspheric | −14.4988 | 0.2781 | | | 97.7405 |
| S11 | Aspheric | 6.7560 | 0.4780 | 1.55 | 56.1 | −26.2615 |
| S12 | Aspheric | 6.1163 | 0.1662 | | | −25.5957 |
| S13 | Aspheric | 7.4801 | 0.5771 | 1.65 | 23.5 | −8.9548 |
| S14 | Aspheric | 7.0186 | 0.1681 | | | −78.3663 |
| S15 | Aspheric | 2.6259 | 0.5978 | 1.54 | 55.7 | −12.7684 |
| S16 | Aspheric | 1.5996 | 0.3514 | | | −0.8109 |
| S17 | Spherical | Infinite | 0.1155 | 1.52 | 64.2 | |
| S18 | Spherical | Infinite | 0.3287 | | | |
| S19 | Spherical | Infinite | | | | |

From Table 7, it can be seen that, in embodiment 3, both the object-side surface and imaging-side surface of any lens in the first lens E1 to the eighth lens E8 are aspheric surfaces. Table 8 shows higher-order coefficients applied to each aspheric mirror surface in embodiment 3. The surface type of each aspheric surface is defined by formula (1) given in embodiment 1.

Table 9 shows effective focal lengths f1 to f8 of the lenses in embodiment 3, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 8

| Surface number | A4 | A6 | A8 | A10 | A12 |
|---|---|---|---|---|---|
| S1 | −2.7987E−04 | 1.1052E−02 | −3.4880E−02 | 6.2128E−02 | −6.7290E−02 |
| S2 | −1.1419E−02 | 1.1080E−03 | 7.0149E−02 | −2.0128E−01 | 3.0400E−01 |
| S3 | −3.4704E−02 | 1.2541E−02 | 7.1313E−02 | −1.6559E−01 | 2.1592E−01 |
| S4 | −6.3988E−02 | 4.3440E−03 | 2.2690E−02 | 3.4827E−02 | −2.4224E−01 |
| S5 | −3.2072E−02 | −7.2730E−02 | −1.1639E−01 | 8.6023E−01 | −2.4889E+00 |
| S6 | 1.9930E−01 | −9.1702E−01 | 6.1199E−01 | 1.9722E+00 | −5.1125E+00 |
| S7 | 1.8578E−01 | −7.5012E−01 | −5.8800E−02 | 3.4796E+00 | −6.8762E+00 |
| S8 | −1.4347E−01 | 5.3033E−01 | −1.4525E+00 | 2.2281E+00 | −2.0396E+00 |
| S9 | −2.1135E−01 | 8.0776E−01 | −1.8898E+00 | 2.6686E+00 | −2.7537E+00 |
| S10 | −8.6659E−02 | 3.6958E−01 | −7.7470E−01 | 8.8638E−01 | −6.0009E−01 |
| S11 | −4.8458E−02 | 5.9593E−02 | −1.7611E−01 | 2.5926E−01 | −2.4669E−01 |
| S12 | 5.5076E−02 | −1.3226E−01 | 1.1938E−01 | −7.3040E−02 | 2.9413E−02 |
| S13 | 8.4402E−02 | −1.7282E−01 | 1.5098E−01 | −9.7870E−02 | 4.1725E−02 |
| S14 | 2.7344E−02 | −5.6330E−02 | 3.4109E−02 | −1.6110E−02 | 5.0360E−03 |
| S15 | −1.5794E−01 | 2.9133E−02 | 1.1519E−02 | −7.4400E−03 | 1.9090E−03 |
| S16 | −2.1731E−01 | 9.7850E−02 | −3.8710E−02 | 1.1188E−02 | −2.1200E−03 |

| Surface number | A14 | A16 | A18 | A20 |
|---|---|---|---|---|
| S1 | 4.1836E−02 | −1.3680E−02 | 1.4870E−03 | 9.5300E−05 |
| S2 | −2.7992E−01 | 1.5415E−01 | −4.6590E−02 | 5.9380E−03 |
| S3 | −1.6365E−01 | 6.4389E−02 | −7.7500E−03 | −1.1900E−03 |
| S4 | 5.1253E−01 | −5.4139E−01 | 2.8877E−01 | −6.0340E−02 |
| S5 | 4.0437E+00 | −3.7445E+00 | 1.8454E+00 | −3.7447E−01 |
| S6 | 5.7757E+00 | −3.7569E+00 | 1.3860E+00 | −2.2432E−01 |
| S7 | 6.8818E+00 | −4.1448E+00 | 1.4790E+00 | −2.4177E−01 |
| S8 | 1.2047E+00 | −5.5468E−01 | 2.1139E−01 | −4.2200E−02 |
| S9 | 2.3432E+00 | −1.5757E+00 | 6.7296E−01 | −1.2716E−01 |
| S10 | 2.3268E−01 | −4.2770E−02 | 3.6300E−04 | 7.5300E−04 |
| S11 | 1.4217E−01 | −4.5940E−02 | 6.2750E−03 | 0.0000E+00 |
| S12 | −7.4600E−03 | 1.0770E−03 | −6.8000E−05 | 0.0000E+00 |
| S13 | −1.0500E−02 | 1.4010E−03 | −7.6000E−05 | 0.0000E+00 |
| S14 | −8.9000E−04 | 7.7700E−05 | −2.4000E−06 | 0.0000E+00 |
| S15 | −2.7000E−04 | 2.1500E−05 | −7.2000E−07 | 0.0000E+00 |
| S16 | 2.4500E−04 | −1.5000E−05 | 4.1200E−07 | 0.0000E+00 |

TABLE 9

| f1(mm) | 3.47 | f7(mm) | −346.12 |
|---|---|---|---|
| f2(mm) | −8.02 | f8(mm) | −9.56 |
| f3(mm) | 9.52 | f(mm) | 4.38 |
| f4(mm) | 769.75 | TTL(mm) | 5.38 |
| f5(mm) | −14.94 | ImgH(mm) | 3.40 |
| f6(mm) | −160.63 | FOV(°) | 74.0 |

Figure 6A:
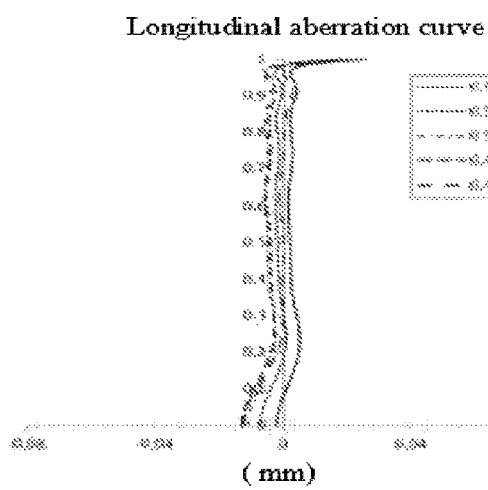
FIG. 6A to FIG. 6D illustrate a longitudinal aberration curve, an astigmatism curve, a distortion curve and a lateral color curve of an optical imaging lens according to embodiment 3 respectively.
Figure 6B:
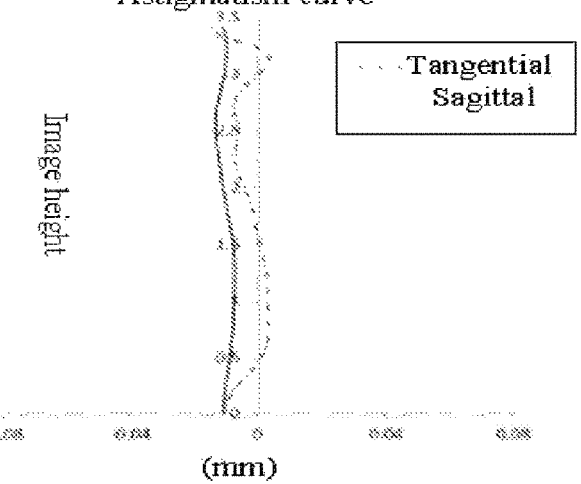
Figure 6C:
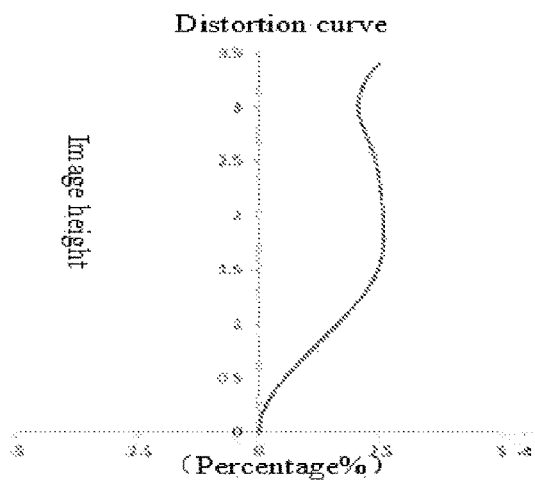
Figure 6D:
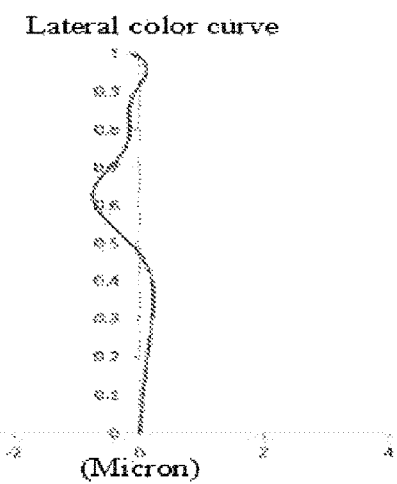

FIG. 6A illustrates a longitudinal aberration curve of the optical imaging lens according to embodiment 3 to represent deviation of a convergence focal point after light with different wavelengths passes through the lens. FIG. 6B illustrates an astigmatism curve of the optical imaging lens according to embodiment 3 to represent a tangential image surface curvature and a sagittal image surface curvature. FIG. 6C illustrates a distortion curve of the optical imaging lens according to embodiment 3 to represent a distortion value under different viewing angles. FIG. 6D illustrates a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 can achieve high imaging quality.

Embodiment 4

Figure 7:
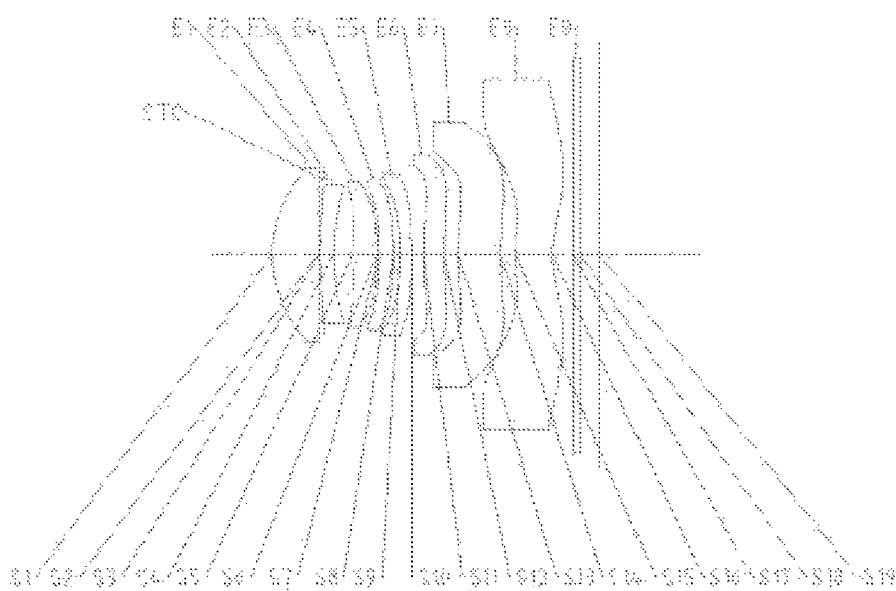
FIG. 7 is a structure diagram of an optical imaging lens according to embodiment 4 of the disclosure.

An optical imaging lens according to embodiment 4 of the disclosure is described below with reference to FIG. 7 to FIG. 8D. FIG. 7 is a structure diagram of an optical imaging lens according to embodiment 4 of the disclosure.

As shown in FIG. 7, the optical imaging lens according to the embodiment of the disclosure includes a first lens E11, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a convex surface. The sixth lens E6 has a positive refractive power, an object-side surface S11 of the sixth lens is a convex surface, and an imaging-side surface S12 of the sixth lens is a concave surface. The seventh lens E7 has a positive refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 10 shows the surface type, the radius of curvature, the thickness, the material and conic coefficient of each lens of the optical imaging lens according to embodiment 4. Units of the radius of curvature and the thickness are millimeter (mm).

TABLE 10

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| S1 | Aspheric | 2.0088 | 0.7800 | 1.55 | 56.1 | −0.0909 |
| S2 | Aspheric | 38.0685 | 0.0931 | | | 83.9835 |
| STO | Spherical | Infinite | −0.0677 | | | 0.0000 |
| S3 | Aspheric | 7.2269 | 0.2300 | 1.65 | 23.5 | −86.1566 |
| S4 | Aspheric | 3.0926 | 0.3254 | | | 3.2671 |
| S5 | Aspheric | 20.7506 | 0.4043 | 1.55 | 56.1 | 38.8875 |
| S6 | Aspheric | −6.3761 | 0.0393 | | | 21.8437 |
| S7 | Aspheric | −9.0611 | 0.2396 | 1.55 | 56.1 | 49.6976 |
| S8 | Aspheric | −8.6066 | 0.1086 | | | 36.4614 |
| S9 | Aspheric | −5.8142 | 0.2000 | 1.66 | 21.5 | −10.1223 |
| S10 | Aspheric | −14.3483 | 0.1968 | | | 92.9265 |
| S11 | Aspheric | 6.6247 | 0.3466 | 1.55 | 56.1 | 5.1526 |
| S12 | Aspheric | 9.6678 | 0.2356 | | | −8.8442 |
| S13 | Aspheric | 5.1993 | 0.7076 | 1.65 | 23.5 | −32.5836 |
| S14 | Aspheric | 6.9105 | 0.25.4 | | | −87.5106 |
| S15 | Aspheric | 3.9810 | 0.6205 | 1.54 | 55.7 | −10.6901 |
| S16 | Aspheric | 1.7149 | 0.3475 | | | −0.8011 |
| S17 | Spherical | Infinite | 0.1213 | 1.52 | 64.2 | |
| S18 | Spherical | Infinite | 0.3236 | | | |
| S19 | Spherical | Infinite | | | | |

From Table 10, it can be seen that, in embodiment 4, both the object-side surface and imaging-side surface of any lens in the first lens E1 to the eighth lens E8 are aspheric surfaces. Table 11 shows higher-order coefficients applied to each aspheric mirror surface in embodiment 4. The surface type of each aspheric surface is defined by formula (1) given in embodiment 1.

TABLE 11

| Surface number | A4 | A6 | A8 | A10 | A12 |
|---|---|---|---|---|---|
| S1 | −4.1733E−03 | 2.3693E−02 | −5.7200E−02 | 7.7382E−02 | −6.0640E−02 |
| S2 | 4.9710E−02 | −2.5343E−01 | 6.2410E−01 | −9.4467E−01 | 9.3040E−01 |
| S3 | 3.6814E−02 | −2.6527E−01 | 6.1755E−01 | −8.2371E−01 | 6.8102E−01 |
| S4 | −4.7907E−02 | −6.8650E−02 | 1.6612E−01 | −2.1557E−01 | 1.7580E−01 |
| S5 | −2.7432E−02 | −1.8000E−02 | −1.6612E−01 | 5.2846E−01 | −9.3827E−01 |
| S6 | −1.1952E−02 | −7.3360E−02 | −3.4980E−01 | 8.5970E−01 | −5.4300E−01 |
| S7 | −3.6843E−02 | 1.6684E−01 | −1.1160E+00 | 2.3404E+00 | −2.2770E+00 |
| S8 | −1.2268E−01 | 3.8445E−01 | −6.9995E−01 | 3.0525E−01 | 8.3691E−01 |
| S9 | −1.7991E−01 | 5.9573E−01 | −1.2040E+00 | 1.3434E+00 | −8.7481E−01 |
| S10 | −1.0032E−01 | 2.8999E−01 | −5.4877E−01 | 5.7169E−01 | −3.5106E−01 |
| S11 | 7.0929E−03 | −6.9910E−02 | 1.1213E−01 | −1.3686E−01 | 9.1868E−02 |
| S12 | 4.6249E−02 | −1.8556E−01 | 2.8111E−01 | −2.6373E−01 | 1.4951E−01 |
| S13 | 4.2396E−02 | −1.2542E−01 | 9.7025E−02 | −4.6760E−02 | 9.5620E−03 |
| S14 | 3.8233E−02 | −6.8560E−02 | 4.1116E−02 | −1.7000E−02 | 4.3550E−03 |
| S15 | −1.7653E−01 | 5.6344E−02 | −1.1280E−02 | 2.9340E−03 | −7.8000E−04 |
| S16 | −1.9535E−01 | 8.5365E−02 | −3.1530E−02 | 8.2340E−03 | −1.3800E−03 |

| Surface number | A14 | A16 | A18 | A20 |
|---|---|---|---|---|
| S1 | 2.4651E−02 | −2.9400E−03 | −1.2100E−03 | 3.2200E−04 |
| S2 | −5.9894E−01 | 2.4223E−01 | −5.5750E−02 | 5.5660E−03 |
| S3 | −3.2968E−01 | 7.5595E−02 | 3.6700E−04 | −2.4000E−03 |
| S4 | −7.1410E−02 | −1.5700E−03 | 1.2951E−02 | −3.1700E−03 |
| S5 | 1.0323E+00 | −6.8061E−01 | 2.4426E−01 | −3.6440E−02 |
| S6 | −3.1410E−01 | 6.2534E−01 | −3.2894E−01 | 6.1337E−02 |
| S7 | 9.4934E−01 | 5.7786E−02 | −1.8165E−01 | 4.4263E−02 |
| S8 | −1.5694E+00 | 1.1992E+00 | −4.4869E−01 | 6.7437E−02 |
| S9 | 3.0559E−01 | −3.7310E−02 | −5.8300E−03 | 1.2190E−03 |
| S10 | 1.2320E−01 | −2.0650E−02 | 1.7800E−04 | 3.6700E−04 |
| S11 | −3.3900E−02 | 5.7840E−03 | −3.0000E−04 | 0.0000E+00 |
| S12 | −5.0860E−02 | 9.5390E−03 | −7.6000E−04 | 0.0000E+00 |
| S13 | 4.3100E−04 | −4.5000E−04 | 4.7900E−05 | 0.0000E+00 |
| S14 | −6.3000E−04 | 4.3200E−05 | −8.9000E−07 | 0.0000E+00 |
| S15 | 1.3000E−04 | −1.1000E−05 | 3.8100E−07 | 0.0000E+00 |
| S16 | 1.4100E−04 | −7.9000E−06 | 1.8800E−07 | 0.0000E+00 |

Table 12 shows effective focal lengths f1 to f8 of the lenses in embodiment 4, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 12

| f1(mm) | 3.85 | f7(mm) | 28.01 |
|---|---|---|---|
| f2(mm) | −8.57 | f8(mm) | −6.20 |
| f3(mm) | 8.97 | f(mm) | 4.29 |
| f4(mm) | 264.70 | TTL(mm) | 5.50 |
| f5(mm) | −14.99 | ImgH(mm) | 3.57 |
| f6(mm) | 37.02 | FOV(°) | 77.8 |

Figure 8A:
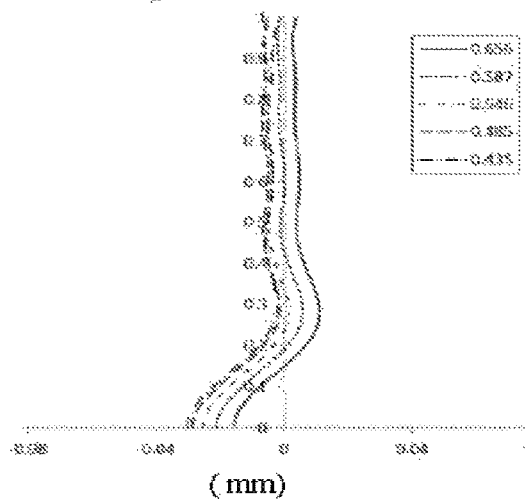
FIG. 8A to FIG. 8D illustrate a longitudinal aberration curve, an astigmatism curve, a distortion curve and a lateral color curve of an optical imaging lens according to embodiment 4 respectively.
Figure 8B:
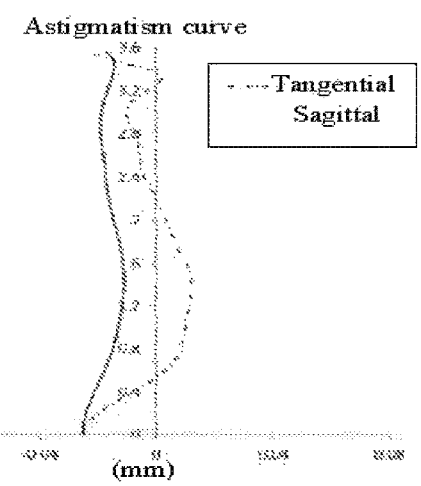
Figure 8C:
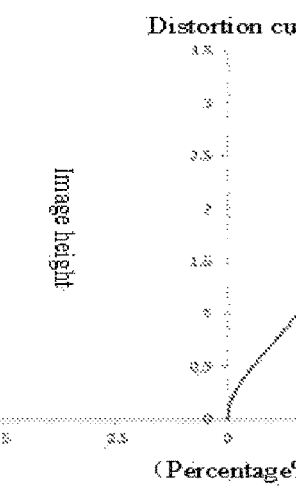
Figure 8D:
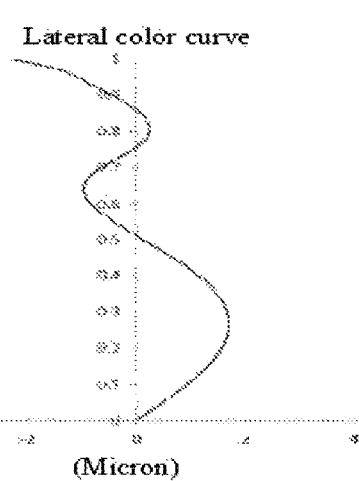

FIG. 8A illustrates a longitudinal aberration curve of the optical imaging lens according to embodiment 4 to represent deviation of a convergence focal point after light with different wavelengths passes through the lens. FIG. 8B illustrates an astigmatism curve of the optical imaging lens according to embodiment 4 to represent a tangential image surface curvature and a sagittal image surface curvature. FIG. 8C illustrates a distortion curve of the optical imaging lens according to embodiment 4 to represent a distortion value under different viewing angles. FIG. 8D illustrates a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 can achieve high imaging quality.

Embodiment 5

Figure 9:
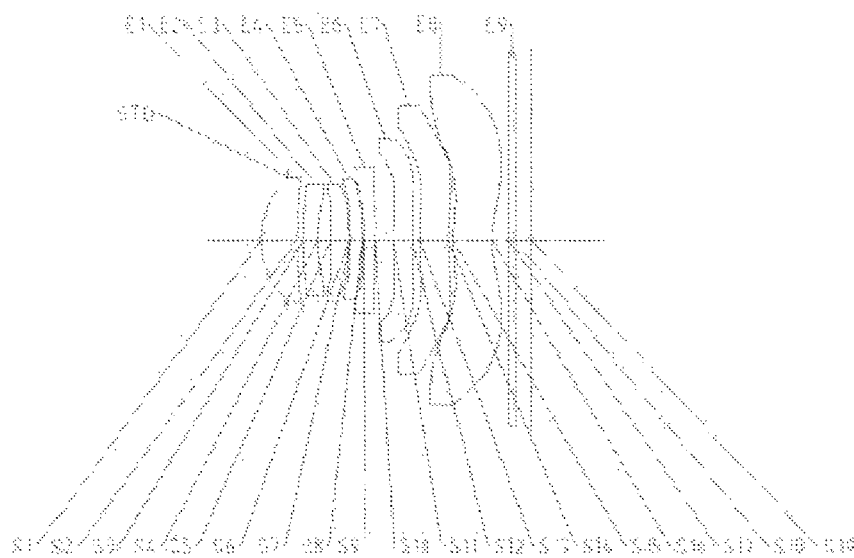
FIG. 9 is a structure diagram of an optical imaging lens according to embodiment 5 of the disclosure.

An optical imaging lens according to embodiment 5 of the disclosure is described below with reference to FIG. 9 to FIG. 10D. FIG. 9 is a structure diagram of an optical imaging lens according to embodiment 5 of the disclosure.

As shown in FIG. 9, the optical imaging lens according to the embodiment of the disclosure includes a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a concave surface. The sixth lens E6 has a positive refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17.

Light from an object sequentially penetrates through each of the surfaces S1 to S18 and is finally image on the imaging surface S19.

Table 13 shows the surface type, the radius of curvature, the thickness, the material and conic coefficient of each lens of the optical imaging lens according to embodiment 5. Units of the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.4749 | | | |
| S1 | Aspheric | 1.5123 | 0.6364 | 1.55 | 56.1 | 0.0233 |
| S2 | Aspheric | 6.8568 | 0.1135 | | | −94.5715 |
| S3 | Aspheric | 5.5906 | 0.2584 | 1.67 | 20.4 | −87.0628 |
| S4 | Aspheric | 3.1716 | 0.2396 | | | 6.0670 |
| S5 | Aspheric | 146.8612 | 0.3149 | 1.55 | 56.1 | −99.0000 |
| S6 | Aspheric | −5.6056 | 0.0250 | | | 27.6823 |
| S7 | Aspheric | −7.9000 | 0.2085 | 1.65 | 23.5 | 60.3590 |
| S8 | Aspheric | −8.7000 | 0.0262 | | | 58.1909 |
| S9 | Aspheric | −10.1964 | 0.2000 | 1.66 | 21.5 | 74.6613 |
| S10 | Aspheric | 31.8006 | 0.3201 | | | −61.6234 |
| S11 | Aspheric | 6.0174 | 0.3365 | 1.67 | 20.4 | −18.5077 |
| S12 | Aspheric | 9.5877 | 0.1401 | | | −85.2838 |
| S13 | Aspheric | 15.4711 | 0.4722 | 1.66 | 21.5 | −99.0000 |
| S14 | Aspheric | 4.7948 | 0.0824 | | | −99.0000 |
| S15 | Aspheric | 2.2737 | 0.6798 | 1.54 | 55.7 | −19.4557 |
| S16 | Aspheric | 1.6633 | 0.3070 | | | −0.7818 |
| S17 | Spherical | Infinite | 0.1100 | 1.52 | 64.2 | |
| S18 | Spherical | Infinite | 0.2853 | | | |
| S19 | Spherical | Infinite | | | | |

From Table 13, it can be seen that, in embodiment 5, both the object-side surface and imaging-side surface of any lens in the first lens E1 to the eighth lens E8 are aspheric surfaces. Table 14 shows higher-order coefficients applied to each aspheric mirror surface in embodiment 5. The surface type of each aspheric surface is defined by formula (1) given in embodiment 1.

TABLE 14

| Surface number | A4 | A6 | A8 | A10 | A12 |
|---|---|---|---|---|---|
| S1 | −1.4600E−03 | 2.5560E−02 | −1.0971E−01 | 3.2167E−01 | −5.8036E−01 |
| S2 | −6.8600E−03 | −2.8000E−02 | 2.9746E−01 | −1.0468E+00 | 2.1305E+00 |
| S3 | −4.6210E−02 | 4.0693E−02 | −1.1675E−01 | 8.7448E−01 | −2.9009E+00 |
| S4 | −9.0380E−02 | 4.6970E−02 | 3.6445E−02 | −4.3321E−01 | 2.2640E+00 |
| S5 | −2.6850E−02 | −2.0917E−01 | 1.3309E+00 | −7.6452E+00 | 2.5335E+01 |
| S6 | 5.8890E−03 | 1.1253E−01 | 2.4516E−01 | −7.3762E+00 | 3.0246E+01 |
| S7 | −7.6200E−02 | 4.0507E−01 | −8.1338E−01 | −3.8417E+00 | 2.2316E+01 |
| S8 | −2.0134E−01 | 1.1010E+00 | −3.2292E+00 | 4.4062E+00 | −2.1744E+00 |
| S9 | −2.0094E−01 | 1.1140E+00 | −3.1490E+00 | 4.9077E+00 | −5.1575E+00 |
| S10 | −9.9680E−02 | 1.6202E−01 | −1.7886E−01 | 1.6613E−01 | −2.5042E−01 |
| S11 | −2.0740E−02 | −5.2670E−02 | 9.6900E−03 | −9.0300E−03 | 3.8417E−02 |
| S12 | 5.5003E−02 | −9.8740E−02 | 2.2042E−02 | 2.3233E−02 | −1.9150E−02 |
| S13 | 7.2113E−02 | −1.6696E−01 | 1.2898E−01 | −7.0160E−02 | 2.6318E−02 |
| S14 | 4.9279E−02 | −1.0858E−01 | 7.3237E−02 | −2.9880E−02 | 7.3390E−03 |
| S15 | −1.2470E−01 | 8.8700E−03 | 2.3481E−02 | −1.2060E−02 | 2.8900E−03 |
| S16 | −2.1696E−01 | 1.0134E−01 | −4.0110E−02 | 1.1013E−02 | −1.9500E−03 |
| Surface number | A14 | A16 | A18 | A20 | |
| S1 | 6.5600E−01 | −4.4995E−01 | 1.7144E−01 | −2.8060E−02 | |
| S2 | −2.6256E+00 | 1.9071E+00 | −7.4569E−01 | 1.2069E−01 | |
| S3 | 5.3146E+00 | −5.6029E+00 | 3.1899E+00 | −7.5487E−01 | |
| S4 | −7.2929E+00 | 1.3286E+01 | −1.2613E+01 | 4.9079E+00 | |
| S5 | −5.1729E+01 | 6.3953E+01 | −4.4136E+01 | 1.3197E+01 | |
| S6 | −5.8343E+01 | 5.9783E+01 | −3.1388E+01 | 6.6681E+00 | |
| S7 | −4.5715E+01 | 4.6807E+01 | −2.4050E+01 | 4.9519E+00 | |
| S8 | −5.9691E−01 | 5.2720E−01 | 3.3383E−01 | −2.1043E−01 | |

TABLE 14-continued

| | | | | |
|---|---|---|---|---|
| S9 | 4.5080E+00 | −3.4133E+00 | 1.7231E+00 | −3.8969E−01 |
| S10 | 3.5782E−01 | −2.7847E−01 | 1.0502E−01 | −1.5330E−02 |
| S11 | −4.1180E−02 | 1.7606E−02 | −2.6800E−03 | 0.0000E+00 |
| S12 | 5.7600E−03 | −7.3000E−04 | 2.4300E−05 | 0.0000E+00 |
| S13 | −6.0200E−03 | 7.4500E−04 | −3.8000E−05 | 0.0000E+00 |
| S14 | −1.0200E−03 | 7.2700E−05 | −2.0000E−06 | 0.0000E+00 |
| S15 | −3.8000E−04 | 2.6500E−05 | −7.6000E−07 | 0.0000E+00 |
| S16 | 2.0900E−04 | −1.2000E−05 | 3.1200E−07 | 0.0000E+00 |

Table 15 shows effective focal lengths f1 to f8 of the lenses in embodiment 5, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 15

| | | | |
|---|---|---|---|
| f1(mm) | 3.41 | f7(mm) | −10.75 |
| f2(mm) | −11.47 | f8(mm) | −18.88 |
| f3(mm) | 9.89 | f(mm) | 3.92 |
| f4(mm) | −148.36 | TTL(mm) | 4.76 |
| f5(mm) | −11.71 | ImgH(mm) | 3.37 |
| f6(mm) | 23.33 | FOV(°) | 79.9 |

Figure 10A:
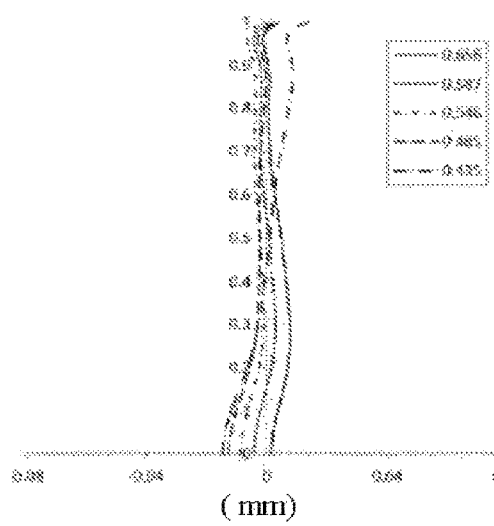
FIG. 10A to FIG. 10D illustrate a longitudinal aberration curve, an astigmatism curve, a distortion curve and a lateral color curve of an optical imaging lens according to embodiment 5 respectively.
Figure 10B:
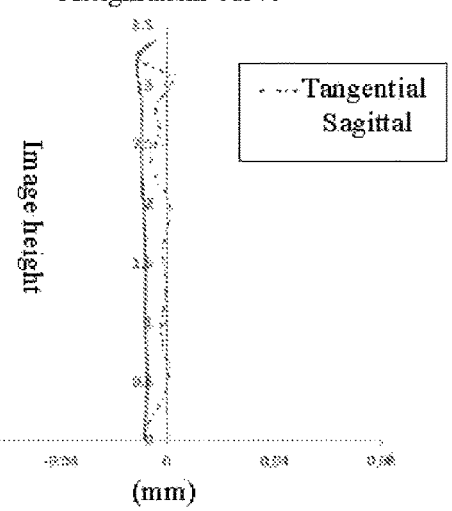
Figure 10C:
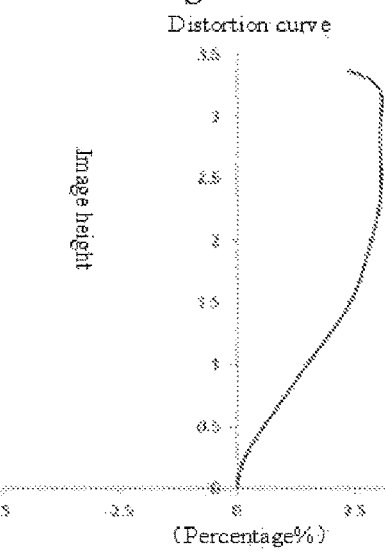
Figure 10D:
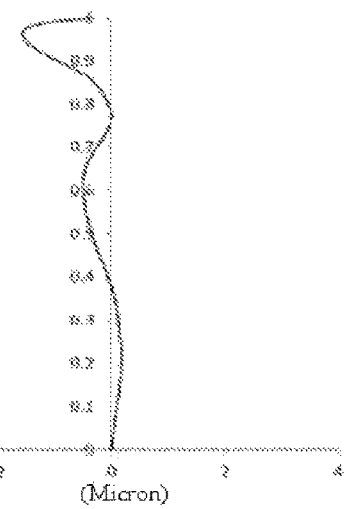

FIG. 10A illustrates a longitudinal aberration curve of the optical imaging lens according to embodiment 5 to represent deviation of a convergence focal point after light with different wavelengths passes through the lens. FIG. 10B illustrates an astigmatism curve of the optical imaging lens according to embodiment 5 to represent a tangential image surface curvature and a sagittal image surface curvature. FIG. 10C illustrates a distortion curve of the optical imaging lens according to embodiment 5 to represent a distortion value under different viewing angles. FIG. 10D illustrates a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 can achieve high imaging quality.

Embodiment 6

Figure 11:
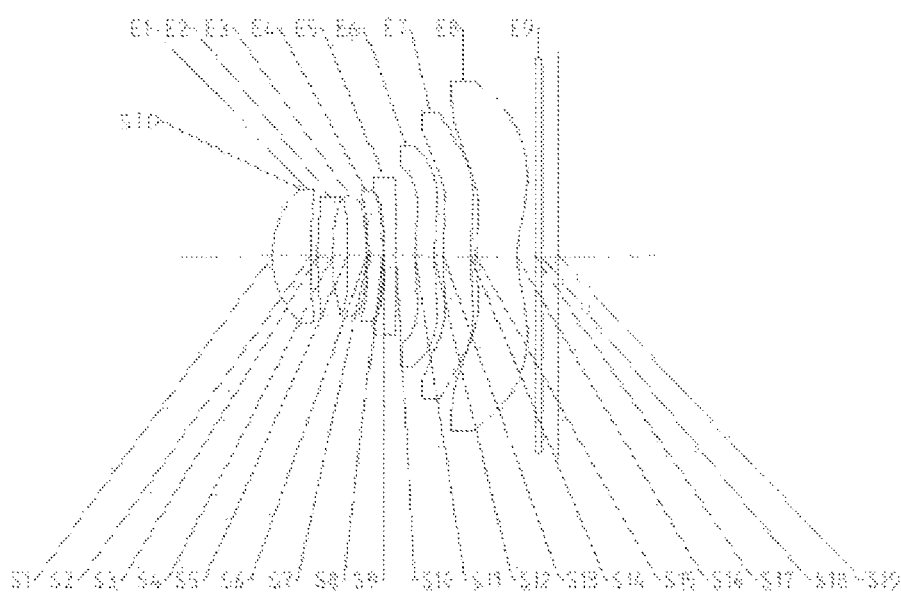
FIG. 11 is a structure diagram of an optical imaging lens according to embodiment 6 of the disclosure.

An optical imaging lens according to embodiment 6 of the disclosure is described below with reference to FIG. 11 to FIG. 12D. FIG. 11 is a structure diagram of an optical imaging lens according to embodiment 6 of the disclosure.

As shown in FIG. 11, the optical imaging lens according to the embodiment of the disclosure includes a diaphragm STO, a first lens E1, a first lens E2, a third lens E3, a fourth lens E4, a fifth lens E5, a sixth lens E6, a seventh lens ET, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a concave surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a concave surface. The sixth lens E6 has a positive refractive power, an object-side surface S11 of the sixth lens is a convex surface, and an imaging-side surface 12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 16 shows the surface type, the radius of curvature, the thickness, material and conic coefficient of each lens of the optical imaging lens according to embodiment 6. Units of the radius of curvature and the thickness are millimeter (mm).

TABLE 16

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.4729 | | | |
| S1 | Aspheric | 1.5205 | 0.6468 | 1.55 | 56.1 | 0.0113 |
| S2 | Aspheric | 7.5661 | 0.1153 | | | −99.0000 |
| S3 | Aspheric | 5.7999 | 0.2517 | 1.67 | 20.4 | −77.6419 |
| S4 | Aspheric | 3.1406 | 0.2522 | | | 6.2109 |
| S5 | Aspheric | −1,000.0000 | 0.3225 | 1.55 | 56.1 | 99.0000 |
| S6 | Aspheric | −5.5173 | 0.0250 | | | 27.2142 |

TABLE 16-continued

| Surface number | Surface type | Radius of curvature | Thickness | Material Refractive index | Abbe number | Conic coefficient |
|---|---|---|---|---|---|---|
| S7 | Aspheric | −7.8566 | 0.2198 | 1.65 | 23.5 | 58.6444 |
| S8 | Aspheric | −8.7000 | 0.0250 | | | 60.7796 |
| S9 | Aspheric | −9.9480 | 0.2000 | 1.66 | 21.5 | 73.3811 |
| S10 | Aspheric | 36.2813 | 0.3146 | | | 71.6085 |
| S11 | Aspheric | 4.9205 | 0.3250 | 1.67 | 20.4 | −19.8500 |
| S12 | Aspheric | 6.4535 | 0.1517 | | | −96.4068 |
| S13 | Aspheric | 11.3809 | 0.4489 | 1.66 | 21.5 | −99.0000 |
| S14 | Aspheric | 4.5920 | 0.0911 | | | −99.0000 |
| S15 | Aspheric | 2.2790 | 0.6798 | 1.54 | 55.7 | −20.2597 |
| S16 | Aspheric | 1.6635 | 0.3044 | | | −0.7801 |
| S17 | Spherical | Infinite | 0.1100 | 1.52 | 64.2 | |
| S18 | Spherical | Infinite | 0.2827 | | | |
| S19 | Spherical | Infinite | | | | |

From Table 16, it can be seen that, in embodiment 6, both the object-side surface and imaging-side surface of any lens in the first lens E1 to the eighth lens E8 are aspheric surfaces. Table 17 shows higher-order coefficients applied to each aspheric mirror surface in embodiment 6. The surface type of each aspheric surface is defined by formula (1) given in embodiment 1.

TABLE 17

| Surface number | A4 | A6 | A8 | A10 | A12 |
|---|---|---|---|---|---|
| S1 | −1.6500E−03 | 2.9852E−02 | −1.3473E−01 | 3.9763E−01 | −7.2557E−01 |
| S2 | −1.0250E−02 | −2.2020E−02 | 3.0846E−01 | −1.1674E+00 | 2.5186E+00 |
| S3 | −5.0730E−02 | 4.5944E−02 | 2.1207E−02 | 9.0501E−01 | −6.6983E−01 |
| S4 | −8.8920E−02 | 5.2240E−02 | 3.6704E−02 | −4.3505E−01 | 2.2618E+00 |
| S5 | −3.4560E−02 | −2.2615E−01 | 1.5404E+00 | −8.6145E+00 | 2.8352E+01 |
| S6 | 5.3983E−02 | −7.9701E−01 | 6.2909E+00 | −2.9591E+01 | 8.1088E+01 |
| S7 | −2.2700E−03 | −6.4703E−01 | 5.6862E+00 | −2.6233E+01 | 6.9871E+01 |
| S8 | −8.5580E−02 | −5.1697E−01 | 6.0942E+00 | −2.4894E+01 | 5.3004E+01 |
| S9 | −1.0722E−01 | −2.3712E−01 | 4.7639E+00 | −1.9913E+01 | 4.1166E+01 |
| S10 | −9.9530E−02 | 1.2357E−01 | 1.4703E−01 | −8.0180E−01 | 1.2499E+00 |
| S11 | −2.7900E−02 | −3.9740E−02 | 1.2300E−03 | 5.2400E−03 | 2.4560E−02 |
| S12 | 6.8502E−02 | −1.3216E−01 | 6.7674E−02 | −1.3840E−02 | −1.0700E−03 |
| S13 | 7.3459E−02 | −1.7628E−01 | 1.3953E−01 | −7.7650E−02 | 2.9854E−02 |
| S14 | 5.2382E−02 | −1.2359E−01 | 8.7750E−02 | −3.7480E−02 | 9.7450E−03 |
| S15 | −1.3509E−01 | 1.2701E−02 | 2.3923E−02 | −1.2750E−02 | 3.0970E−03 |
| S16 | −2.2200E−01 | 1.0311E−01 | −3.9150E−02 | 1.0119E−02 | −1.6700E−03 |

| Surface number | A14 | A16 | A18 | A20 |
|---|---|---|---|---|
| S1 | 8.2981E−01 | −5.7743E−01 | 2.2366E−01 | −3.7340E−02 |
| S2 | −3.3066E+00 | 2.5892E+00 | −1.1112E+00 | 2.0176E−01 |
| S3 | 1.5495E+00 | −1.8240E+00 | 1.1095E+00 | −2.7120E−01 |
| S4 | −7.2929E+00 | 1.3286E+01 | −1.2613E+01 | 4.9079E+00 |
| S5 | −5.7656E+01 | 7.0976E+01 | −4.8762E+01 | 1.4497E+01 |
| S6 | −1.3230E+02 | 1.2619E+02 | −6.4968E+01 | 1.3992E+01 |
| S7 | −1.0967E+02 | 9.9955E+01 | −4.8998E+01 | 1.0017E+01 |
| S8 | −6.5099E+01 | 4.6718E+01 | −1.8336E+01 | 3.0646E+00 |
| S9 | −4.9009E+01 | 3.4447E+01 | −1.3409E+01 | 2.2412E+00 |
| S10 | −9.9392E−01 | 4.3473E−01 | −9.9420E−02 | 9.2670E−03 |
| S11 | −3.0630E−02 | 1.3787E−02 | −2.1500E−03 | 0.0000E+00 |
| S12 | 5.4400E−04 | 1.0200E−04 | −3.2000E−05 | 0.0000E+00 |
| S13 | −7.0000E−03 | 8.8700E−04 | −4.7000E−05 | 0.0000E+00 |
| S14 | −1.4700E−03 | 1.1900E−04 | −4.0000E−06 | 0.0000E+00 |
| S15 | −4.1000E−04 | 2.8600E−05 | −8.2000E−07 | 0.0000E+00 |
| S16 | 1.6600E−04 | −9.0000E−06 | 2.0700E−07 | 0.0000E+00 |

Table 18 shows effective focal lengths f1 to f8 of the lenses in embodiment 6, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 18

| | | | |
|---|---|---|---|
| f1(mm) | 3.36 | f7(mm) | −12.01 |
| f2(mm) | −10.66 | f8(mm) | −18.67 |
| f3(mm) | 10.15 | f(mm) | 3.94 |
| f4(mm) | −139.94 | TTL(mm) | 4.77 |
| f5(mm) | −11.84 | ImgH(mm) | 3.37 |
| f6(mm) | 28.60 | FOV(°) | 79.5 |

Figures 12A, 12B:
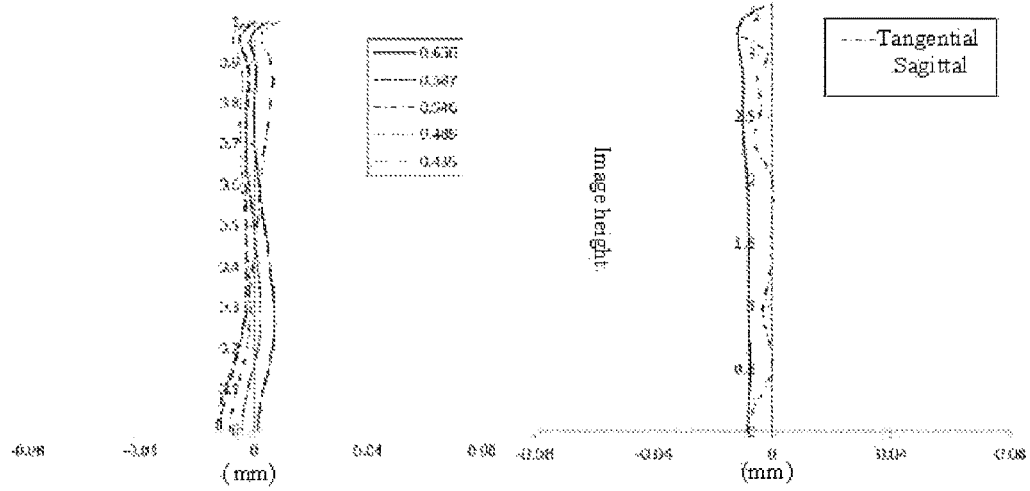
FIG. 12A to FIG. 12D illustrate a longitudinal aberration curve, an astigmatism curve, a distortion curve and a lateral color curve of an optical imaging lens according to embodiment 6 respectively.
Figure 12C:
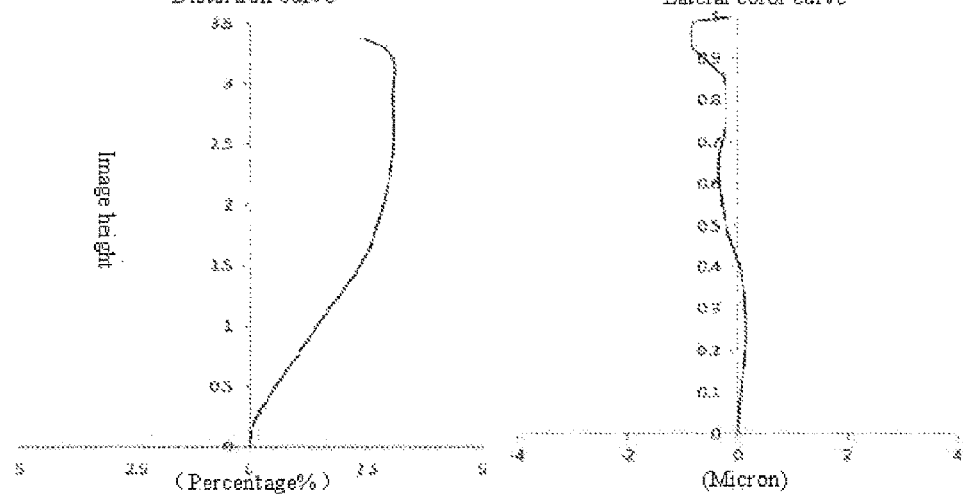
Figure 12D:
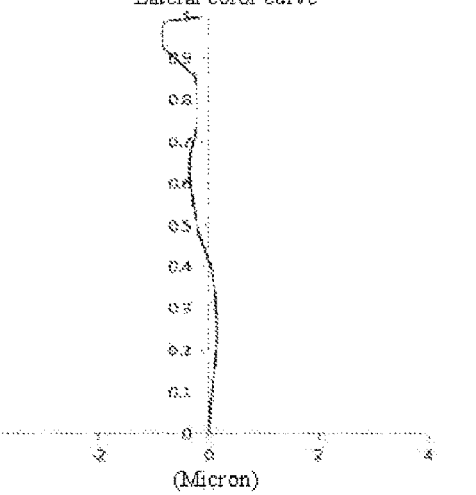

FIG. 12A illustrates a longitudinal aberration curve of the optical imaging lens according to embodiment 6 to represent deviation of a convergence focal point after light with different wavelengths passes through the lens. FIG. 12B illustrates an astigmatism curve of the optical imaging lens according to embodiment 6 to represent a tangential image surface curvature and a sagittal image surface curvature. FIG. 12C illustrates a distortion curve of the optical imaging lens according to embodiment 6 to represent a distortion value under different viewing angles. FIG. 12D illustrates a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 can achieve high imaging quality.

Embodiment 7

Figure 13:
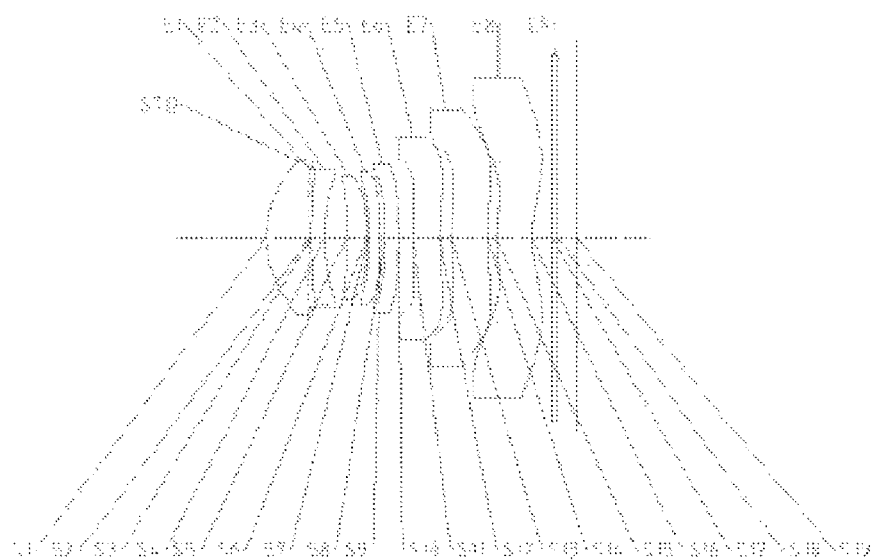
FIG. 13 is a structure diagram of an optical imaging lens according to embodiment 7 of the disclosure.
Figure 14A:
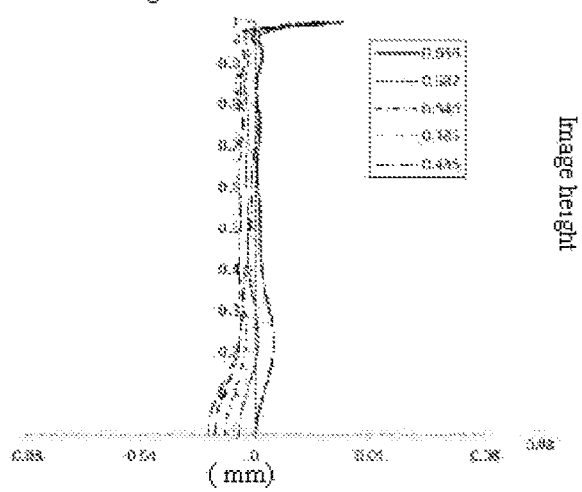
FIG. 14A to FIG. 14D illustrate a longitudinal aberration curve, an astigmatism curve, a distortion curve and a lateral color curve of an optical imaging lens according to embodiment 7 respectively.
Figure 14B:
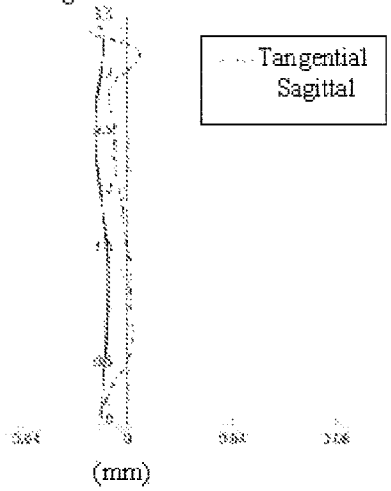

An optical imaging lens according to embodiment 7 of the disclosure is described below with reference to FIG. 13 to FIG. 14D. FIG. 13 is a structure diagram of an optical imaging lens according to embodiment 7 of the disclosure.

As shown in FIG. 13, the optical imaging lens according to the embodiment of the disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a convex surface. The sixth lens E6 has a negative refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 19 shows the surface type, the radius of curvature, thickness, the material and conic coefficient of each lens of the optical imaging lens according to embodiment 7. Units of the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 1.8675 | 0.7500 | 1.55 | 56.1 | −0.0963 |
| S2 | Aspheric | 167.5900 | 0.0654 | | | 99.0000 |
| STO | Spherical | Infinite | −0.0358 | | | 0.0000 |
| S3 | Aspheric | 8.3971 | 0.2342 | 1.65 | 23.5 | −93.5372 |
| S4 | Aspheric | 3.0434 | 0.3749 | | | 4.0844 |
| S5 | Aspheric | 30.4339 | 0.3637 | 1.55 | 56.1 | −35.4280 |
| S6 | Aspheric | −5.8950 | 0.0250 | | | 23.9867 |
| S7 | Aspheric | −9.0794 | 0.2027 | 1.55 | 56.1 | 46.4346 |
| S8 | Aspheric | −17.3228 | 0.0943 | | | 99.0000 |
| S9 | Aspheric | −9.3000 | 0.2304 | 1.66 | 21.5 | −29.1592 |
| S10 | Aspheric | −12.5000 | 0.2458 | | | 81.7820 |
| S11 | Aspheric | 9.2369 | 0.4668 | 1.55 | 56.1 | 3.5433 |
| S12 | Aspheric | 8.2651 | 0.2091 | | | −7.1315 |
| S13 | Aspheric | 8.7254 | 0.6100 | 1.65 | 23.5 | −43.5770 |
| S14 | Aspheric | 5.2533 | 0.1534 | | | −71.3828 |
| S15 | Aspheric | 2.4287 | 0.6083 | 1.54 | 55.7 | −9.9621 |
| S16 | Aspheric | 1.6080 | 0.3507 | | | −0.8078 |
| S17 | Spherical | Infinite | 0.1155 | 1.52 | 64.2 | |
| S18 | Spherical | Infinite | 0.3280 | | | |
| S19 | Spherical | Infinite | | | | |

From Table 19, it can be seen that, in embodiment 7, both the object-side surface and imaging-side surface of any lens in the first lens E1 to the eighth lens E8 are aspheric surfaces. Table 20 shows higher-order coefficients applied to each aspheric mirror surface in embodiment 7. The surface type of each aspheric surface is defined by formula (1) given in embodiment 1.

Figure 14C:
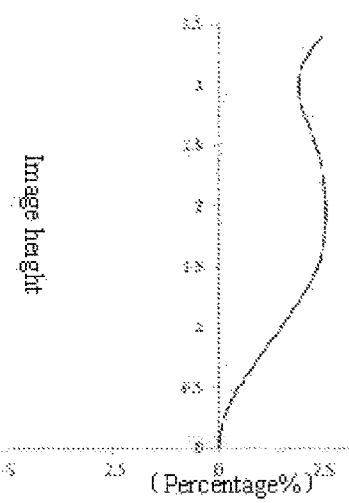
Figure 14D:
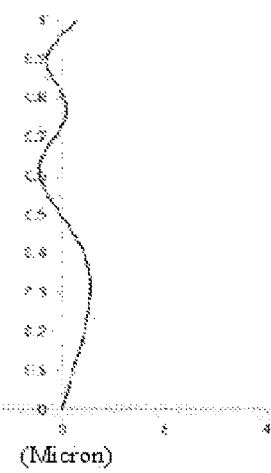

FIG. 14C illustrates a distortion curve of the optical imaging lens according to embodiment 7 to represent a distortion value under different viewing angles. FIG. 14D illustrates a lateral color curve of the optical imaging lens according to embodiment 7 to represent deviation of different image heights on the imaging surface after the light passes through the lens. According to FIG. 14A to FIG. 14D, it can be seen

TABLE 20

| Surface number | A4 | A6 | A8 | A10 | A12 |
|---|---|---|---|---|---|
| S1 | 2.8528E−04 | 8.7050E−03 | −2.6230E−02 | 4.2286E−02 | −3.8360E−02 |
| S2 | −6.8325E−04 | −6.5120E−02 | 2.8558E−01 | −6.3496E−01 | 8.6875E−01 |
| S3 | −2.4675E−02 | −6.3140E−02 | 3.2717E−01 | −7.0349E−01 | 9.6142E−01 |
| S4 | −6.4174E−02 | −1.6800E−02 | 1.0927E−01 | −1.9236E−01 | 1.8632E−01 |
| S5 | −3.4800E−02 | −8.0790E−02 | 1.0900E−04 | 3.1157E−01 | −1.0141E+00 |
| S6 | 1.4993E−01 | −5.2893E−01 | −9.9763E−01 | 5.9403E+00 | −1.1140E+01 |
| S7 | 1.2836E−01 | −1.7244E−01 | −2.4925E+00 | 9.5440E+00 | −1.6393E+01 |
| S8 | −1.6613E−01 | 7.0841E−01 | −2.5343E+00 | 5.5119E+00 | −7.5258E+00 |
| S9 | −1.5985E−01 | 5.7863E−01 | −1.7839E+00 | 3.6861E+00 | −5.1080E+00 |
| S10 | −2.7733E−02 | 1.1606E−01 | −4.0812E−01 | 7.7575E−01 | −9.1651E−01 |
| S11 | 1.7215E−02 | −7.6520E−02 | −2.4830E−02 | 1.5287E−01 | −2.0802E−01 |
| S12 | 7.6508E−02 | −1.8366E−01 | 1.8399E−01 | −1.2796E−01 | 5.9166E−02 |
| S13 | 7.8660E−02 | −1.8201E−01 | 1.6172E−01 | −1.0354E−01 | 4.2966E−02 |
| S14 | 4.1116E−02 | −7.8910E−02 | 5.1979E−02 | −2.4370E−02 | 7.5790E−03 |
| S15 | −1.7076E−01 | 6.2034E−02 | −1.7270E−02 | 5.4930E−03 | −1.4000E−03 |
| S16 | −2.1972E−01 | 1.0300E−01 | −4.2250E−02 | 1.2455E−02 | −2.4000E−03 |

| Surface number | A14 | A16 | A18 | A20 |
|---|---|---|---|---|
| S1 | 1.5553E−02 | 6.5100E−04 | −2.8400E−03 | 6.5700E−04 |
| S2 | −7.5778E−01 | 4.0790E−01 | −1.2333E−01 | 1.6011E−02 |
| S3 | −8.4496E−01 | 4.5991E−01 | −1.3995E−01 | 1.8133E−02 |
| S4 | −2.5130E−02 | −1.2589E−01 | 1.1410E−01 | −3.1310E−02 |
| S5 | 1.7354E+00 | −1.6508E+00 | 8.2095E−01 | −1.6657E−01 |
| S6 | 1.1360E+01 | −6.7470E+00 | 2.1961E+00 | −3.0138E−01 |
| S7 | 1.6152E+01 | −9.4906E+00 | 3.1270E+00 | −4.4773E−01 |
| S8 | 6.4231E+00 | −3.3341E+00 | 9.6883E−01 | −1.2182E−01 |
| S9 | 4.5949E+00 | −2.5848E+00 | 8.3441E−01 | −1.1969E−01 |
| S10 | 6.7915E−01 | −3.0450E−01 | 7.4597E−02 | −7.4200E−03 |
| S11 | 1.4214E−01 | −5.1150E−02 | 7.5300E−03 | 0.0000E+00 |
| S12 | −1.7440E−02 | 2.9610E−03 | −2.2000E−04 | 0.0000E+00 |
| S13 | −1.0600E−02 | 1.4040E−03 | −7.7000E−05 | 0.0000E+00 |
| S14 | −1.4100E−03 | 1.4100E−04 | −5.7000E−06 | 0.0000E+00 |
| S15 | 2.1500E−04 | −1.7000E−05 | 5.5200E−07 | 0.0000E+00 |
| S16 | 2.8300E−04 | −1.8000E−05 | 5.0400E−07 | 0.0000E+00 |

Table 21 shows effective focal lengths f1 to f8 of the lenses in embodiment 7, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 21

| f1(mm) | 3.45 | f7(mm) | −21.98 |
|---|---|---|---|
| f2(mm) | −7.53 | f8(mm) | −11.95 |
| f3(mm) | 9.07 | f(mm) | 4.39 |
| f4(mm) | −35.22 | TTL(mm) | 5.39 |
| f5(mm) | −56.83 | ImgH(mm) | 3.40 |
| f6(mm) | −173.13 | FOV(°) | 74.0 |

FIG. 14A illustrates a longitudinal aberration curve of the optical imaging lens according to embodiment 7 to represent deviation of a convergence focal point after light with different wavelengths passes through the lens. FIG. 14B illustrates an astigmatism curve of the optical imaging lens according to embodiment 7 to represent a tangential image surface curvature and a sagittal image surface curvature.

that the optical imaging lens provided in embodiment 7 may achieve high imaging quality.

Embodiment 8

Figure 15:
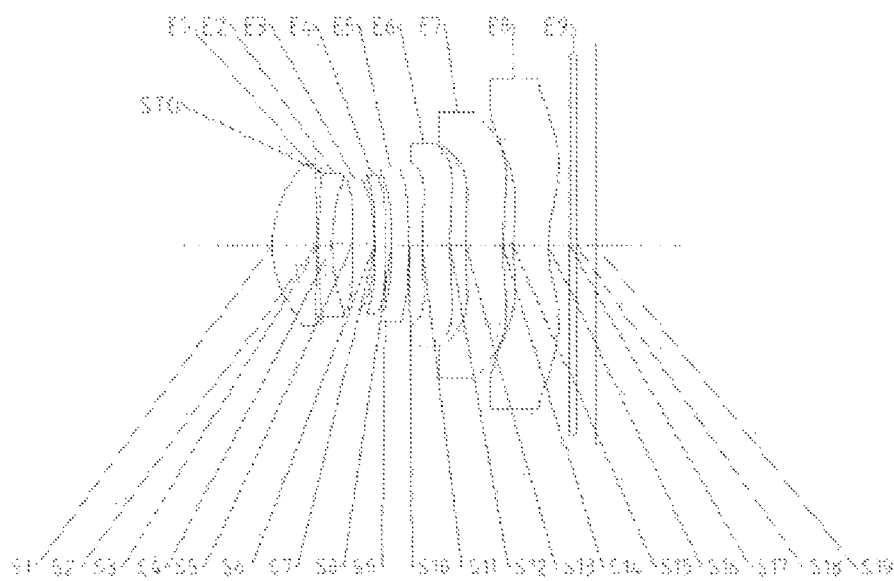
FIG. 15 is a structure diagram of an optical imaging lens according to embodiment 8 of the disclosure.

An optical imaging lens according to embodiment 8 of the disclosure is described below with reference to FIG. 15 to FIG. 16D. FIG. 15 is a structure diagram of an optical imaging lens according to embodiment 8 of the disclosure.

As shown in FIG. 15, the optical imaging lens according to the embodiment of the disclosure includes a first lens E11, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a positive refractive power, an object-side surface S9 of the fifth lens is a concave surface, and an imaging-side surface S of the fifth lens is a convex surface. The sixth lens E6 has a positive refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 22 shows the surface type, the radius of curvature, thickness, the material and conic coefficient of each lens of the optical imaging lens according to embodiment 8. Units of the radius of curvature and the thickness are millimeter (mm).

TABLE 22

| Surface number | Surface type | Radius of curvature | Thickness | Refractive index | Abbe number | Conic coefficient |
| --- | --- | --- | --- | --- | --- | --- |
| OBJ | Spherical | Infinite | Infinite | | | |
| S1 | Aspheric | 1.8881 | 0.7500 | 1.55 | 56.1 | −0.0853 |
| S2 | Aspheric | 508.6413 | 0.0656 | | | 99.0000 |
| STO | Spherical | Infinite | −0.0346 | | | 0.0000 |
| S3 | Aspheric | 8.2332 | 0.2300 | 1.65 | 23.5 | −89.4558 |
| S4 | Aspheric | 2.9519 | 0.3406 | | | 3.9940 |
| S5 | Aspheric | 22.1811 | 0.3741 | 1.55 | 56.1 | 99.0000 |
| S6 | Aspheric | −5.9828 | 0.0250 | | | 23.5623 |
| S7 | Aspheric | −9.2259 | 0.1717 | 1.55 | 56.1 | 47.5533 |
| S8 | Aspheric | −40.1694 | 0.0977 | | | −99.0000 |
| S9 | Aspheric | −13.5000 | 0.2974 | 1.66 | 21.5 | 26.5777 |
| S10 | Aspheric | −12.5000 | 0.2159 | | | 83.3160 |
| S11 | Aspheric | 9.9607 | 0.4720 | 1.55 | 56.1 | 27.1310 |
| S12 | Aspheric | 11.4253 | 0.2659 | | | 16.5052 |
| S13 | Aspheric | 8.9209 | 0.6254 | 1.65 | 23.5 | −99.0000 |
| S14 | Aspheric | 4.9204 | 0.1707 | | | −71.4297 |
| S15 | Aspheric | 2.7283 | 0.5864 | 1.54 | 55.7 | −9.2498 |
| S16 | Aspheric | 1.6661 | 0.3438 | | | −0.7979 |
| S17 | Spherical | Infinite | 0.1155 | 1.52 | 64.2 | |
| S18 | Spherical | Infinite | 0.3210 | | | |
| S19 | Spherical | Infinite | | | | |

From Table 22, it can be seen that, in embodiment 8, both the object-side surface and imaging-side surface of any lens in the first lens E1 to the eighth lens E8 are aspheric surfaces. Table 23 shows higher-order coefficients applied to each aspheric mirror surface in embodiment 8. The surface type of each aspheric surface is defined by formula (1) given in embodiment 1.

TABLE 23

| Surface number | A4 | A6 | A8 | A10 | A12 |
| --- | --- | --- | --- | --- | --- |
| S1 | 8.5630E−04 | 5.5720E−03 | −1.4890E−02 | 1.6988E−02 | −4.5300E−03 |
| S2 | 1.5933E−02 | −1.4229E−01 | 4.7764E−01 | −9.2747E−01 | 1.1531E+00 |
| S3 | −1.0073E−02 | −1.4847E−01 | 5.5272E−01 | −1.0512E+00 | 1.3039E+00 |
| S4 | −6.6346E−02 | −1.9880E−02 | 3.9560E−02 | 2.3822E−01 | −9.2562E−01 |
| S5 | −3.8461E−02 | −6.0480E−02 | −9.2990E−02 | 6.3803E−01 | −1.6320E+00 |
| S6 | 1.4135E−01 | −7.8212E−01 | 8.3973E−01 | 4.8283E−01 | −2.0304E+00 |
| S7 | 1.4998E−01 | −6.6357E−01 | 4.8319E−01 | 1.1608E+00 | −3.0030E+00 |
| S8 | −8.3408E−02 | 8.1120E−03 | 2.1126E−01 | −5.2408E−01 | 3.4898E−01 |
| S9 | −6.2586E−02 | −1.4269E−01 | 5.5943E−01 | −7.2521E−01 | −2.9690E−02 |
| S10 | 5.2107E−02 | −3.3103E−01 | 7.5037E−01 | −1.0933E+00 | 1.0502E+00 |
| S11 | 9.8752E−02 | −3.2810E−01 | 4.5329E−01 | −4.3335E−01 | 2.5153E−01 |
| S12 | 9.9920E−02 | −2.4781E−01 | 2.8870E−01 | −2.3045E−01 | 1.1950E−01 |
| S13 | 6.0715E−02 | −1.6657E−01 | 1.4035E−01 | −8.2940E−02 | 3.1086E−02 |
| S14 | 4.3666E−02 | −8.3640E−02 | 5.4356E−02 | −2.4250E−02 | 7.1220E−03 |
| S15 | −1.9109E−01 | 9.1599E−02 | −3.6550E−02 | 1.2555E−02 | −2.9500E−03 |
| S16 | −2.1943E−01 | 1.0543E−01 | −4.3530E−02 | 1.2819E−02 | −2.4700E−03 |

TABLE 23-continued

| Surface number | A14 | A16 | A18 | A20 |
|---|---|---|---|---|
| S1 | −1.1620E−02 | 1.3380E−02 | −6.0100E−03 | 9.8800E−04 |
| S2 | −9.3472E−01 | 4.7628E−01 | −1.3829E−01 | 1.7434E−02 |
| S3 | −1.0680E+00 | 5.5657E−01 | −1.6661E−01 | 2.1763E−02 |
| S4 | 1.5878E+00 | −1.4968E+00 | 7.5461E−01 | −1.5958E−01 |
| S5 | 2.4539E+00 | −2.1889E+00 | 1.0644E+00 | −2.1824E−01 |
| S6 | 2.0938E+00 | −1.0234E+00 | 2.1919E−01 | −9.2900E−03 |
| S7 | 3.1274E+00 | −1.7714E+00 | 5.4746E−01 | −7.4000E−02 |
| S8 | 2.3214E−01 | −4.7792E−01 | 2.6857E−01 | −5.4080E−02 |
| S9 | 1.0666E+00 | −1.1854E+00 | 5.5803E−01 | −1.0098E−01 |
| S10 | −6.5714E−01 | 2.5809E−01 | −5.8870E−02 | 6.3020E−03 |
| S11 | −8.0210E−02 | 9.5750E−03 | 3.4500E−04 | 0.0000E+00 |
| S12 | −3.8700E−02 | 7.0980E−03 | −5.6000E−04 | 0.0000E+00 |
| S13 | −7.0100E−03 | 8.6600E−04 | −4.5000E−05 | 0.0000E+00 |
| S14 | −1.2600E−03 | 1.2000E−04 | −4.6000E−06 | 0.0000E+00 |
| S15 | 4.1700E−04 | −3.2000E−05 | 9.9500E−07 | 0.0000E+00 |
| S16 | 2.9300E−04 | −1.9000E−05 | 5.3600E−07 | 0.0000E+00 |

Table 24 shows effective focal lengths f1 to f8 of the lenses in embodiment 8, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 24

| f1(mm) | 3.48 | f7(mm) | −18.12 |
|---|---|---|---|
| f2(mm) | −7.26 | f8(mm) | −9.87 |
| f3(mm) | 8.66 | f(mm) | 4.42 |
| f4(mm) | −21.96 | TTL(mm) | 5.43 |
| f5(mm) | 229.35 | ImgH(mm) | 3.40 |
| f6(mm) | 127.65 | FOV(°) | 73.6 |

Figure 16A:
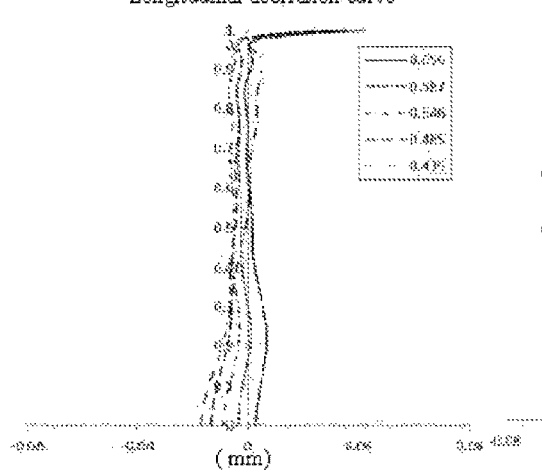
FIG. 16A to FIG. 16D illustrate a longitudinal aberration curve, an astigmatism curve, a distortion curve and a lateral color curve of an optical imaging lens according to embodiment 8 respectively.
Figure 16B:
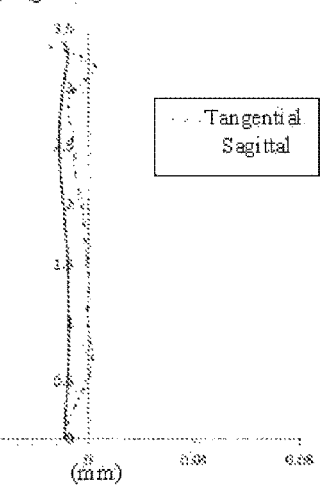
Figure 16C:
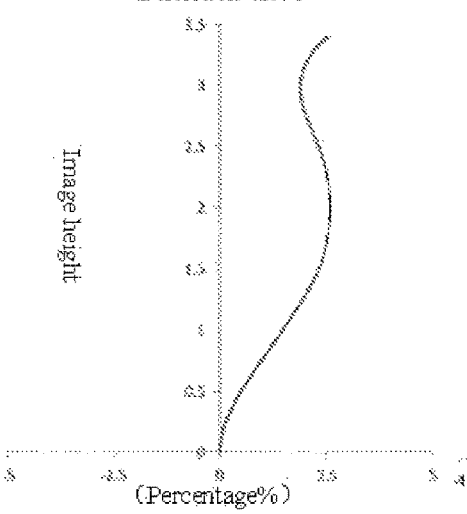
Figure 16D:
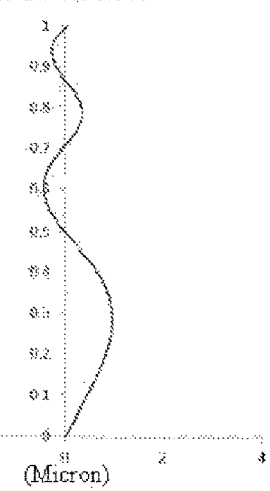

FIG. 16A illustrates a longitudinal aberration curve of the optical imaging lens according to embodiment 8 to represent deviation of a convergence focal point after light with different wavelengths passes through the lens. FIG. 16B illustrates an astigmatism curve of the optical imaging lens according to embodiment 8 to represent a tangential image surface curvature and a sagittal image surface curvature. FIG. 16C illustrates a distortion curve of the optical imaging lens according to embodiment 8 to represent a distortion value under different viewing angles. FIG. 16D illustrates a lateral color curve of the optical imaging lens according to embodiment 8 to represent deviation of different image heights on the imaging surface after the light passes through the lens. According to FIG. 16A to FIG. 16D, it can be seen that the optical imaging lens provided in embodiment 8 can achieve high imaging quality.

Embodiment 9

Figure 17:
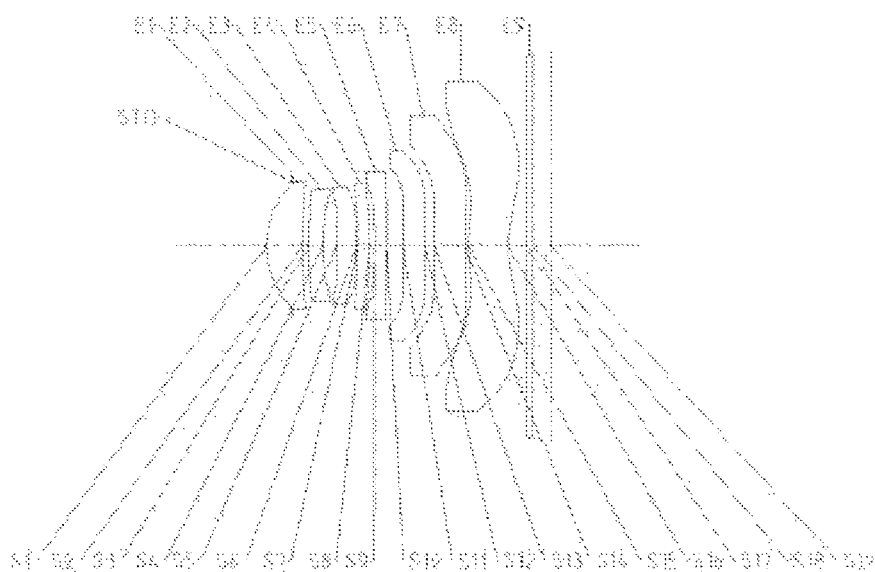
FIG. 17 is a structure diagram of an optical imaging lens according to embodiment 9 of the disclosure.

An optical imaging lens according to embodiment 9 of the disclosure is described below with reference to FIG. 17 to FIG. 18D. FIG. 17 is a structure diagram of an optical imaging lens according to embodiment 9 of the disclosure.

As shown in FIG. 17, the optical imaging lens according to the embodiment of the disclosure includes a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a concave surface. The sixth lens E6 has a positive refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a concave surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 25 shows the surface type, the radius of curvature, thickness, the material and conic coefficient of each lens of the optical imaging lens according to embodiment 9. Units of the radius of curvature and the thickness are millimeter (mm).

TABLE 25

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.4537 | | | |
| S1 | Aspheric | 1.5293 | 0.6167 | 1.55 | 56.1 | 0.0113 |
| S2 | Aspheric | 7.5869 | 0.1101 | | | −99.0000 |
| S3 | Aspheric | 5.7481 | 0.2482 | 1.67 | 20.4 | −89.6355 |
| S4 | Aspheric | 3.1462 | 0.2367 | | | 5.9632 |
| S5 | Aspheric | 44.6328 | 0.3452 | 1.55 | 56.1 | −99.0000 |
| S6 | Aspheric | −6.3485 | 0.0250 | | | 30.3509 |
| S7 | Aspheric | −9.1099 | 0.2000 | 1.65 | 23.5 | 0.0000 |
| S8 | Aspheric | −8.1226 | 0.0900 | | | 0.0000 |
| S9 | Aspheric | 9.9887 | 0.2000 | 1.66 | 21.5 | 66.8747 |
| S10 | Aspheric | 21.0348 | 0.2923 | | | −99.0000 |
| S11 | Aspheric | 10.6101 | 0.3728 | 1.67 | 20.4 | −99.0000 |
| S12 | Aspheric | 107.3000 | 0.1676 | | | −99.0000 |
| S13 | Aspheric | −20.2451 | 0.5191 | 1.66 | 21.5 | 89.3536 |
| S14 | Aspheric | 11.8277 | 0.0661 | | | −99.0000 |
| S15 | Aspheric | 2.7930 | 0.6798 | 1.54 | 55.7 | −17.0193 |
| S16 | Aspheric | 1.7099 | 0.3084 | | | −0.7641 |
| S17 | Spherical | Infinite | 0.1100 | 1.52 | 64.2 | |
| S18 | Spherical | Infinite | 0.2867 | | | |
| S19 | Spherical | Infinite | | | | |

From Table 25, it can be seen that, in embodiment 9, both the object-side surface and imaging-side surface of any lens in the first lens E1 to the eighth lens E8 are aspheric surfaces. Table 26 shows higher-order coefficients applied to each aspheric mirror surface in embodiment 9. The surface type of each aspheric surface is defined by formula (1) given in embodiment 1.

Table 27 shows effective focal lengths f1 to f8 of the lenses in embodiment 9, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 26

| Surface number | A4 | A6 | A8 | A10 | A12 |
|---|---|---|---|---|---|
| S1 | 6.3336E−04 | 2.1776E−02 | −9.5070E−02 | 2.9970E−01 | −5.9352E−01 |
| S2 | −1.2822E−02 | −9.3690E−03 | 2.9734E−01 | −1.2707E+00 | 3.0727E+00 |
| S3 | −5.0933E−02 | 3.4336E−02 | 7.2497E−02 | −1.4456E−01 | 1.6738E−01 |
| S4 | −9.1830E−02 | −4.5857E−02 | 9.4846E−01 | −5.2828E+00 | 1.7749E+01 |
| S5 | −3.1141E−02 | −2.1757E−01 | 1.2043E+00 | −6.7303E+00 | 2.2552E+01 |
| S6 | 3.9748E−02 | −2.1384E−01 | 7.6609E−01 | −3.2787E+00 | 8.4701E+00 |
| S7 | −1.8679E−02 | 7.9287E−02 | −5.5386E−01 | 1.9345E+00 | −4.4686E+00 |
| S8 | −7.6829E−02 | 8.2879E−02 | −2.2829E−01 | 6.2049E−01 | −1.1130E+00 |
| S9 | −4.1761E−02 | −5.9881E−02 | 3.4711E−02 | −4.7600E−02 | 8.4006E−02 |
| S10 | 4.4662E−02 | −1.4064E−01 | 9.9308E−02 | −5.5820E−02 | 3.2250E−02 |
| S11 | 1.1753E−01 | −2.4292E−01 | 2.1790E−01 | −1.4978E−01 | 7.3680E−02 |
| S12 | 4.6136E−02 | −1.1560E−01 | 8.9463E−02 | −4.3420E−02 | 1.3349E−02 |
| S13 | −1.3012E−01 | 1.2406E−02 | 2.6005E−02 | −1.5710E−02 | 4.4050E−03 |
| S14 | −2.0713E−01 | 9.5513E−02 | −3.6570E−02 | 9.6610E−03 | −1.6400E−03 |
| S15 | 6.3336E−04 | 2.1776E−02 | −9.5070E−02 | 2.9970E−01 | −5.9352E−01 |
| S16 | −1.2822E−02 | −9.3690E−03 | 2.9734E−01 | −1.2707E+00 | 3.0727E+00 |

| Surface number | A14 | A16 | A18 | A20 |
|---|---|---|---|---|
| S1 | 7.5934E−01 | −6.0791E−01 | 2.7689E−01 | −5.5060E−02 |
| S2 | −4.5602E+00 | 4.0732E+00 | −2.0060E+00 | 4.1780E−01 |
| S3 | −2.2480E−01 | 3.4018E−01 | −2.8934E−01 | 9.6828E−02 |
| S4 | −3.7178E+01 | 4.7381E+01 | −3.3567E+01 | 1.0178E+01 |
| S5 | −4.6913E+01 | 5.9242E+01 | −4.1515E+01 | 1.2426E+01 |
| S6 | −1.3580E+01 | 1.3457E+01 | −7.5138E+00 | 1.8052E+00 |
| S7 | 6.4060E+00 | −5.4411E+00 | 2.5312E+00 | −5.0668E−01 |
| S8 | 1.2423E+00 | −7.9941E−01 | 2.6866E−01 | −3.6490E−02 |
| S9 | −8.2150E−02 | 3.9378E−02 | −7.2400E−03 | 0.0000E+00 |
| S10 | −1.5250E−02 | 4.2170E−03 | −4.8000E−04 | 0.0000E+00 |
| S11 | −2.3080E−02 | 4.0900E−03 | −3.1000E−04 | 0.0000E+00 |
| S12 | −2.5000E−03 | 2.6000E−04 | −1.2000E−05 | 0.0000E+00 |
| S13 | −6.8000E−04 | 5.4800E−05 | −1.8000E−06 | 0.0000E+00 |
| S14 | 1.6800E−04 | −9.3000E−06 | 2.1500E−07 | 0.0000E+00 |
| S15 | 7.5934E−01 | −6.0791E−01 | 2.7689E−01 | −5.5060E−02 |
| S16 | −4.5602E+00 | 4.0732E+00 | −2.0060E+00 | 4.1780E−01 |

TABLE 27

| f1(mm) | 3.38 | f7(mm) | −11.23 |
|---|---|---|---|
| f2(mm) | −10.83 | f8(mm) | −10.51 |
| f3(mm) | 10.19 | f(mm) | 4.09 |
| f4(mm) | 107.65 | TTL(mm) | 4.87 |
| f5(mm) | −10.27 | ImgH(mm) | 3.37 |
| f6(mm) | 17.61 | FOV(°) | 77.0 |

Figure 18A:
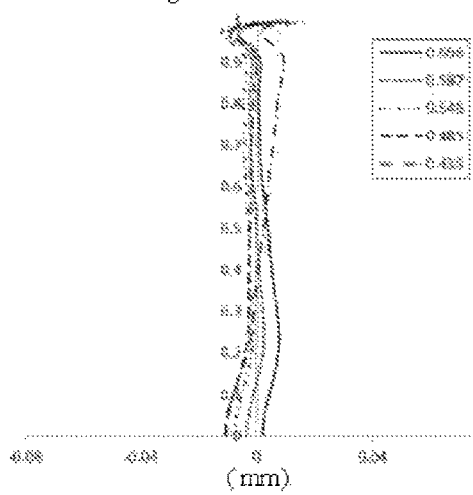
FIG. 18A to FIG. 18D illustrate a longitudinal aberration curve, an astigmatism curve, a distortion curve and a lateral color curve of an optical imaging lens according to embodiment 9 respectively.
Figure 18B:
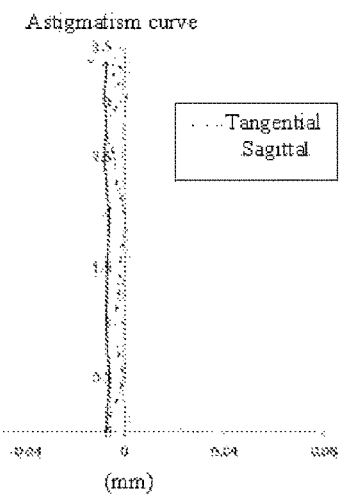
Figure 18C:
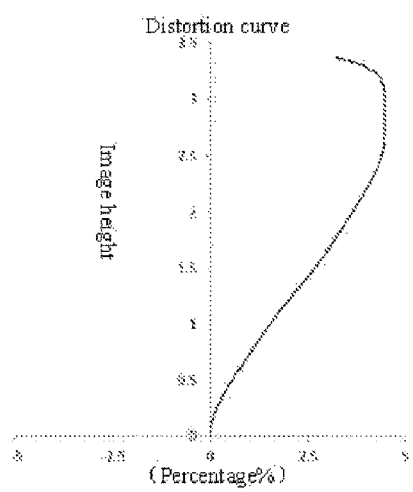
Figure 18D:
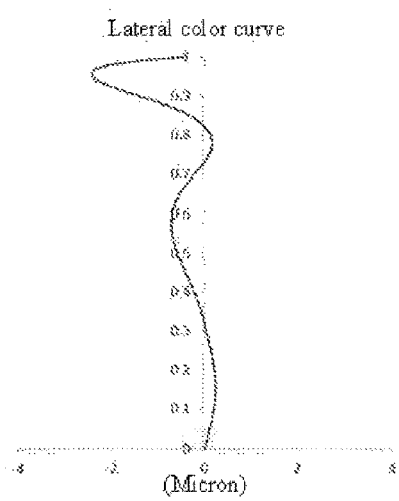

FIG. 18A illustrates a longitudinal aberration curve of the optical imaging lens according to embodiment 9 to represent deviation of a convergence focal point after light with different wavelengths passes through the lens. FIG. 18B illustrates an astigmatism curve of the optical imaging lens according to embodiment 9 to represent a tangential image surface curvature and a sagittal image surface curvature. FIG. 18C illustrates a distortion curve of the optical imaging lens according to embodiment 9 to represent a distortion value under different viewing angles. FIG. 18D illustrates a lateral color curve of the optical imaging lens according to embodiment 9 to represent deviation of different image heights on the imaging surface after the light passes through the lens. According to FIG. 18A to FIG. 18D, it can be seen that the optical imaging lens provided in embodiment 9 may achieve high imaging quality.

Embodiment 10

An optical imaging lens according to embodiment 10 of the disclosure is described below with reference to FIG. 19 to FIG. 20D. FIG. 19 is a structure diagram of an optical imaging lens according to embodiment 10 of the disclosure.

As shown in FIG. 19, the optical imaging lens according to the embodiment of the disclosure includes a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a positive refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a concave surface. The sixth lens E6 has a positive refractive power, an object-side surface S11 of the sixth lens is a convex surface, and an imaging-side surface S12 of the sixth lens is a convex surface. The seventh lens E7 has a negative refractive power, an object-side surface S13 of the seventh lens is a concave surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to 18 and is finally image on the imaging surface 19.

Table 28 shows the surface type, the radius of curvature, thickness, the material and conic coefficient of each lens of the optical imaging lens according to embodiment 10. Units of the radius of curvature and the thickness are millimeter (mm).

TABLE 28

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.4509 | | | |
| S1 | Aspheric | 1.5695 | 0.6226 | 1.55 | 56.1 | −0.0089 |
| S2 | Aspheric | 9.1851 | 0.1202 | | | −98.9996 |
| S3 | Aspheric | 6.0393 | 0.2300 | 1.67 | 20.4 | −86.7838 |
| S4 | Aspheric | 3.1080 | 0.2631 | | | 5.9484 |
| S5 | Aspheric | 38.5521 | 0.4002 | 1.55 | 56.1 | 98.9744 |
| S6 | Aspheric | −6.6009 | 0.0250 | | | 29.9811 |
| S7 | Aspheric | −8.9410 | 0.2000 | 1.65 | 23.5 | 0.0000 |
| S8 | Aspheric | −7.5284 | 0.0833 | | | 0.0000 |
| S9 | Aspheric | −9.7317 | 0.2000 | 1.66 | 21.5 | 53.8250 |
| S10 | Aspheric | 18.5548 | 2886 | | | −98.9924 |
| S11 | Aspheric | 9.1567 | 0.3614 | 1.67 | 20.4 | −99.0000 |
| S12 | Aspheric | −499.7010 | 0.1731 | | | −74.2577 |
| S13 | Aspheric | −33.1353 | 0.4824 | 1.66 | 21.5 | 99.0000 |
| S14 | Aspheric | 7.7460 | 0.1210 | | | −98.9999 |
| S15 | Aspheric | 2.8665 | 0.6798 | 1.54 | 55.7 | −19.6764 |
| S16 | Aspheric | 1.7357 | 0.3019 | | | −0.7611 |
| S17 | Spherical | Infinite | 0.1100 | 1.52 | 64.2 | |
| S18 | Spherical | Infinite | 0.2802 | | | |
| S19 | Spherical | Infinite | | | | |

From Table 28, it can be seen that, in embodiment 10, both the object-side surface and imaging-side surface of any lens in the first lens E1 to the eighth lens E8 are aspheric surfaces. Table 29 shows higher-order coefficients applied to each aspheric mirror surface in embodiment 10. The surface type of each aspheric surface is defined by formula (1) given in embodiment 1.

TABLE 29

| Surface number | A4 | A6 | A8 | A10 | A12 |
|---|---|---|---|---|---|
| S1 | 2.4561E−03 | 4.9475E−03 | −1.0110E−02 | 3.2379E−02 | −7.1700E−02 |
| S2 | −1.8516E−02 | 1.1896E−02 | 2.0001E−01 | −9.1072E−01 | 2.1384E+00 |
| S3 | −5.9073E−02 | 7.0134E−02 | 2.9573E−02 | −1.7067E−01 | 3.1775E−01 |
| S4 | −1.0663E−01 | 5.1409E−02 | 2.5411E−01 | −1.5356E+00 | 4.9554E+00 |
| S5 | −4.8954E−02 | −1.5115E−01 | 8.1616E−01 | −4.3254E+00 | 1.3648E+01 |
| S6 | 1.9176E−02 | −1.2517E−01 | 3.2941E−01 | −1.5070E+00 | 3.8942E+00 |
| S7 | −2.4152E−02 | 1.8048E−01 | −8.3411E−01 | 2.2254E+00 | −4.1670E+00 |
| S8 | −9.5772E−02 | 2.2359E−01 | −6.1840E−01 | 1.2576E+00 | −1.7700E+00 |
| S9 | −6.9692E−02 | 2.5842E−02 | −1.4546E−01 | 1.8236E−01 | −8.4120E−02 |
| S10 | 3.8306E−02 | −1.0235E−01 | −3.1070E−02 | 1.3416E−01 | −1.1640E−01 |
| S11 | 1.2814E−01 | −2.5419E−01 | 1.9992E−01 | −1.1645E−01 | 5.1445E−02 |
| S12 | 4.2152E−02 | −1.1490E−01 | 9.1561E−02 | −4.6250E−02 | 1.5023E−02 |
| S13 | −1.4953E−01 | 1.9932E−02 | 2.7321E−02 | −1.7730E−02 | 5.1290E−03 |
| S14 | −2.1101E−01 | 9.8425E−02 | −3.8180E−02 | 1.0312E−02 | −1.8100E−03 |
| S15 | 2.4561E−03 | 4.9475E−03 | −1.0110E−02 | 3.2379E−02 | −7.1700E−02 |
| S16 | −1.8516E−02 | 1.1896E−02 | 2.0001E−01 | −9.1072E−01 | 2.1384E+00 |

| Surface number | A14 | A16 | A18 | A20 |
|---|---|---|---|---|
| S1 | 1.1338E−01 | −1.1574E−01 | 6.5422E−02 | −1.5810E−02 |
| S2 | −3.0318E+00 | 2.5761E+00 | −1.2058E+00 | 2.3845E−01 |
| S3 | −4.0017E−01 | 3.8759E−01 | −2.3763E−01 | 6.5157E−02 |
| S4 | −9.9803E+00 | 1.2418E+01 | −8.6626E+00 | 2.6086E+00 |
| S5 | −2.6576E+01 | 3.1381E+01 | −2.0551E+01 | 5.7423E+00 |
| S6 | −5.9963E+00 | 5.6443E+00 | −2.9849E+00 | 6.7654E−01 |
| S7 | 5.1161E+00 | −3.8236E+00 | 1.5806E+00 | −2.8201E−01 |
| S8 | 1.6318E+00 | −9.0754E−01 | 2.7248E−01 | −3.3820E−02 |
| S9 | −2.5710E−02 | 3.7496E−02 | −9.3500E−03 | 0.0000E+00 |
| S10 | 4.9781E−02 | −1.0600E−02 | 8.8300E−04 | 0.0000E+00 |
| S11 | −1.5450E−02 | 2.7330E−03 | −2.1000E−04 | 0.0000E+00 |
| S12 | −3.0100E−03 | 3.3700E−04 | −1.6000E−05 | 0.0000E+00 |
| S13 | −8.0000E−04 | 6.5900E−05 | −2.2000E−06 | 0.0000E+00 |
| S14 | 1.9300E−04 | −1.1000E−05 | 2.7600E−07 | 0.0000E+00 |
| S15 | 1.1338E−01 | −1.1574E−01 | 6.5422E−02 | −1.5810E−02 |
| S16 | −3.0318E+00 | 2.5761E+00 | −1.2058E+00 | 2.3845E−01 |

Table 30 shows effective focal lengths f1 to f8 of the lenses in embodiment 10, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 30

| f1(mm) | 3.37 | f7(mm) | −9.50 |
|---|---|---|---|
| f2(mm) | −9.90 | f8(mm) | −10.37 |
| f3(mm) | 10.35 | f(mm) | 4.16 |
| f4(mm) | 69.99 | TTL(mm) | 4.94 |
| f5(mm) | −9.67 | ImgH(mm) | 3.23 |
| f6(mm) | 13.47 | FOV(°) | 73.4 |

FIG. 20A illustrates a longitudinal aberration curve of the optical imaging lens according to embodiment 10 to represent deviation of a convergence focal point after light with different wavelengths passes through the lens. FIG. 20B illustrates an astigmatism curve of the optical imaging lens according to embodiment 10 to represent a tangential image surface curvature and a sagittal image surface curvature. FIG. 20C illustrates a distortion curve of the optical imaging lens according to embodiment 10 to represent a distortion value under different viewing angles. FIG. 20D illustrates a lateral color curve of the optical imaging lens according to embodiment 10 to represent deviation of different image heights on the imaging surface after the light passes through the lens. According to FIG. 20A to FIG. 20D, it can be seen that the optical imaging lens provided in embodiment 10 may achieve high imaging quality.

Embodiment 11

Figure 21:
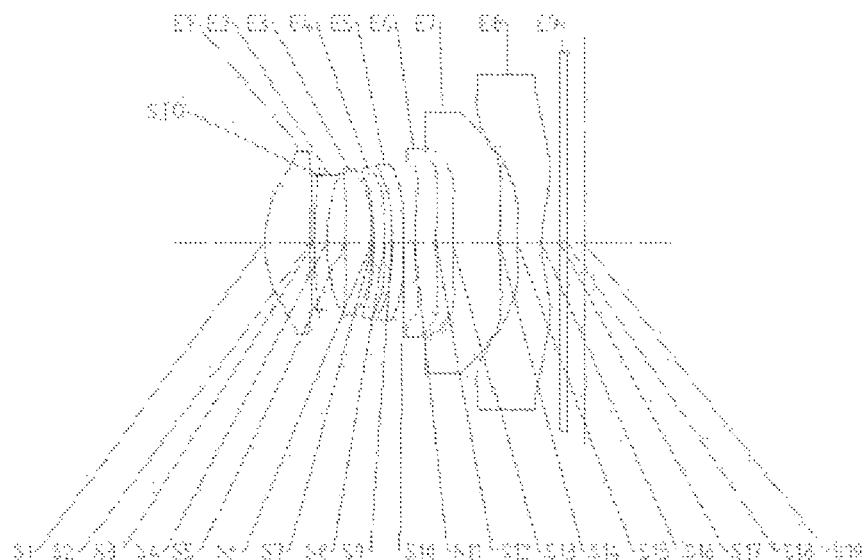
FIG. 21 is a structure diagram of an optical imaging lens according to embodiment 11 of the disclosure.

An optical imaging lens according to embodiment 11 of the disclosure is described below with reference to FIG. 21 to FIG. 22D. FIG. 21 is a structure diagram of an optical imaging lens according to embodiment 11 of the disclosure.

As shown in FIG. 21, the optical imaging lens according to the embodiment of the disclosure includes a first lens E1, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a negative refractive power, an object-side surface S9 of the fifth lens is a concave surface, and an imaging-side surface S10 of the fifth lens is a convex surface. The sixth lens E6 has a positive refractive power, an object-side surface S11 of the sixth lens is a convex surface, and an imaging-side surface S12 of the sixth lens is a concave surface. The seventh lens E7 has a positive refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17.

Light from an object sequentially penetrates through each of the surfaces S1 to S18 and is finally image on the imaging surface S19.

Table 31 shows the surface type, the radius of curvature, thickness, the material and conic coefficient of each lens of the optical imaging lens according to embodiment 11. Units of the radius of curvature and the thickness are millimeter (mm).

TABLE 31

| Surface number | Surface type | Radius of curvature | Thickness | Refractive index | Abbe number | Conic coefficient |
|---|---|---|---|---|---|---|
| OBJ | Spherical | Infinite | Infinite | | | |
| S1 | Aspheric | 2.0954 | 0.8889 | 1.55 | 56.1 | −0.1335 |
| S2 | Aspheric | 48.5815 | 0.1375 | | | −99.0000 |
| STO | Spherical | Infinite | −0.0830 | | | 0.0000 |
| S3 | Aspheric | 6.5616 | 0.2300 | 1.65 | 23.5 | −76.0832 |
| S4 | Aspheric | 2.8952 | 0.3250 | | | 3.0946 |
| S5 | Aspheric | 12.2086 | 0.4693 | 1.55 | 56.1 | 97.1717 |
| S6 | Aspheric | −6.9292 | 0.0250 | | | 21.5669 |
| S7 | Aspheric | −9.5821 | 0.2000 | 1.55 | 56.1 | 49.5877 |
| S8 | Aspheric | −18.5397 | 0.1259 | | | 88.7691 |
| S9 | Aspheric | −10.0000 | 0.2073 | 1.66 | 21.5 | 8.9600 |
| S10 | Aspheric | −13.0000 | 0.1869 | | | 78.8630 |
| S11 | Aspheric | 7.7941 | 0.3723 | 1.55 | 56.1 | 11.5442 |
| S12 | Aspheric | 9.1229 | 0.2858 | | | −20.1630 |
| S13 | Aspheric | 5.1138 | 0.7866 | 1.65 | 23.5 | −50.8022 |
| S14 | Aspheric | 8.4459 | 0.3142 | | | −91.1761 |
| S15 | Aspheric | 6.4255 | 0.4272 | 1.54 | 55.7 | −14.6556 |
| S16 | Aspheric | 1.7976 | 0.3266 | | | −0.7821 |
| S17 | Spherical | Infinite | 0.1213 | 1.52 | 64.2 | |
| S18 | Spherical | Infinite | 0.3027 | | | |
| S19 | Spherical | Infinite | | | | |

From Table 31, it can be seen that, in embodiment 11, both the object-side surface and imaging-side surface of any lens in the first lens E1 to the eighth lens E8 are aspheric surfaces. Table 32 shows higher-order coefficients applied to each aspheric mirror surface in embodiment 11. The surface type of each aspheric surface is defined by formula (1) given in embodiment 1.

TABLE 32

| Surface number | A4 | A6 | A8 | A10 | A12 |
|---|---|---|---|---|---|
| S1 | −5.2706E−03 | 2.8474E−02 | −8.1630E−02 | 1.3249E−01 | −1.3360E−01 |
| S2 | 3.6694E−02 | −1.4793E−01 | 3.0180E−01 | −3.9320E−01 | 3.3280E−01 |
| S3 | 3.4286E−02 | −2.1268E−01 | 4.7118E−01 | −6.6025E−01 | 6.4417E−01 |
| S4 | −4.4905E−02 | −1.1634E−01 | 3.3003E−01 | −5.4214E−01 | 5.3926E−01 |
| S5 | −2.8450E−02 | 1.1177E−02 | −2.8739E−01 | 9.2935E−01 | −1.7290E+00 |
| S6 | 7.5756E−03 | −1.7249E−01 | −8.9470E−02 | 7.8877E−01 | −1.2121E+00 |
| S7 | 1.8016E−03 | −1.2502E−01 | −1.9415E−01 | 9.8673E−01 | −1.5301E+00 |
| S8 | −3.4900E−02 | −5.1770E−02 | 1.2243E−01 | −1.5273E−01 | −8.1400E−02 |
| S9 | −1.4289E−02 | −1.3265E−01 | 1.3800E−04 | 7.0894E−02 | −1.8140E+00 |
| S10 | 6.0572E−02 | −3.2977E−01 | 5.7892E−01 | −6.8772E−01 | 5.2672E−01 |
| S11 | 6.9953E−02 | −1.9684E−01 | 2.7103E−01 | −2.8396E−01 | 1.8401E−01 |
| S12 | −3.8418E−03 | −7.5850E−02 | 1.6492E−01 | −2.0229E−01 | 1.3573E−01 |
| S13 | 1.5100E−02 | −9.9230E−02 | 9.8889E−02 | −6.1790E−02 | 1.9899E−02 |
| S14 | 3.5272E−02 | −8.2460E−02 | 5.9140E−02 | −2.6870E−02 | 7.4830E−03 |
| S15 | −1.6444E−01 | 2.8983E−02 | 1.3464E−02 | −8.5000E−03 | 2.1560E−03 |
| S16 | −2.0950E−01 | 9.2411E−02 | −3.3790E−02 | 8.9570E−03 | −1.5600E−03 |

| Surface number | A14 | A16 | A18 | A20 |
|---|---|---|---|---|
| S1 | 8.3298E−02 | −3.1300E−02 | 6.3970E−03 | −5.4000E−04 |
| S2 | −1.8294E−01 | 6.2676E−02 | −1.2110E−02 | 1.0050E−03 |
| S3 | −4.2959E−01 | 1.8622E−01 | −4.6930E−02 | 5.1830E−03 |
| S4 | −2.5384E−01 | −1.7040E−02 | 6.7369E−02 | −1.9330E−02 |
| S5 | 2.0054E+00 | −1.4168E+00 | 5.5717E−01 | −9.3830E−02 |
| S6 | 9.3360E−01 | −3.9622E−01 | 8.6643E−02 | −7.3000E−03 |
| S7 | 1.2749E+00 | −6.1470E−01 | 1.6392E−01 | −1.8690E−02 |
| S8 | 3.4824E−01 | −3.1239E−01 | 1.2127E−01 | −1.7740E−02 |

TABLE 32-continued

| | | | | |
|---|---|---|---|---|
| S9 | 2.2440E+00 | −1.5072E+00 | 5.2552E−01 | −7.4580E−02 |
| S10 | −2.1495E−01 | 2.2372E−02 | 1.1865E−02 | −2.8800E−03 |
| S11 | −6.8340E−02 | 1.2488E−02 | −8.2000E−04 | 0.0000E+00 |
| S12 | −5.1770E−02 | 1.0527E−02 | −8.9000E−04 | 0.0000E+00 |
| S13 | −2.8200E−03 | 3.2100E−05 | 2.0300E−05 | 0.0000E+00 |
| S14 | −1.2300E−03 | 1.0800E−04 | −3.9000E−06 | 0.0000E+00 |
| S15 | −3.0000E−04 | 2.1600E−05 | −6.6000E−07 | 0.0000E+00 |
| S16 | 1.6600E−04 | −9.8000E−06 | 2.4400E−07 | 0.0000E+00 |

Table 33 shows effective focal lengths f1 to f8 of the lenses in embodiment 11, a total effective focal length f of the optical imaging lens, a TTL which is a distance from a center of the object-side surface S1 of the first lens E1 to the imaging surface S19 on the optical axis, a ImgH which is a half of a diagonal length of an effective pixel

TABLE 33

| | | | |
|---|---|---|---|
| f1(mm) | 3.98 | f7(mm) | 18.39 |
| f2(mm) | −8.24 | f8(mm) | −4.80 |
| f3(mm) | 8.16 | f(mm) | 4.38 |
| f4(mm) | −36.58 | TTL(mm) | 5.57 |
| f5(mm) | −67.71 | ImgH(mm) | 3.57 |
| f6(mm) | 89.10 | FOV(°) | 76.7 |

Figure 22A:
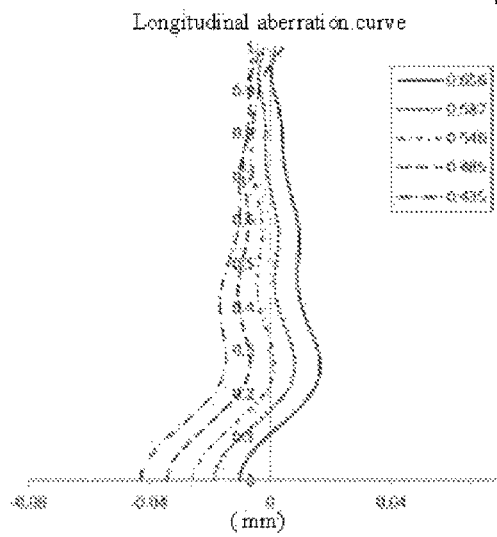
FIG. 22A to FIG. 22D illustrate a longitudinal aberration curve, an astigmatism curve, a distortion curve and a lateral color curve of an optical imaging lens according to embodiment 11 respectively.
Figure 22B:
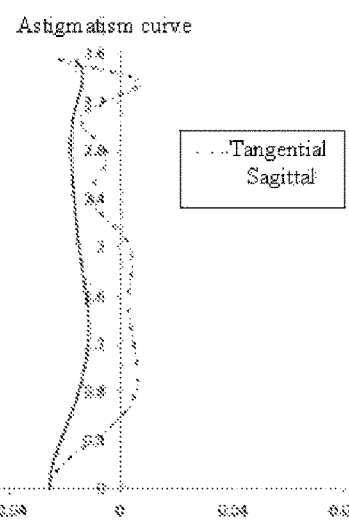
Figure 22C:
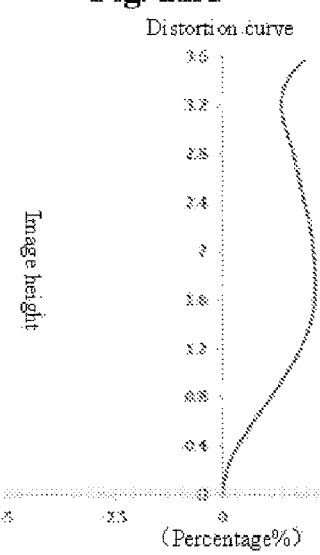
Figure 22D:
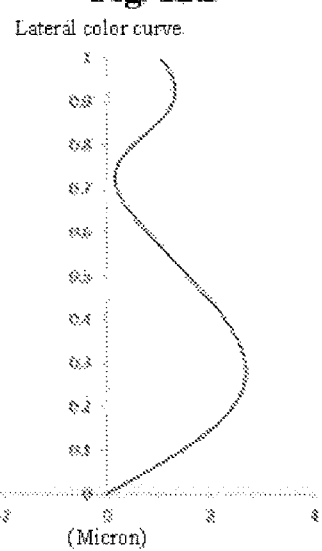

FIG. 22A illustrates a longitudinal aberration curve of the optical imaging lens according to embodiment 11 to represent deviation of a convergence focal point after light with different wavelengths passes through the lens. FIG. 22B illustrates an astigmatism curve of the optical imaging lens according to embodiment 11 to represent a tangential image surface curvature and a sagittal image surface curvature. FIG. 22C illustrates a distortion curve of the optical imaging lens according to embodiment 11 to represent a distortion value under different viewing angles. FIG. 22D illustrates a lateral color curve of the optical imaging lens according to embodiment 11 to represent deviation of different image heights on the imaging surface after the light passes through the lens. According to FIG. 22A to FIG. 22D, it can be seen that the optical imaging lens provided in embodiment 11 may achieve high imaging quality.

Embodiment 12

Figures 23, 24A, 24B, 24C, 24D:
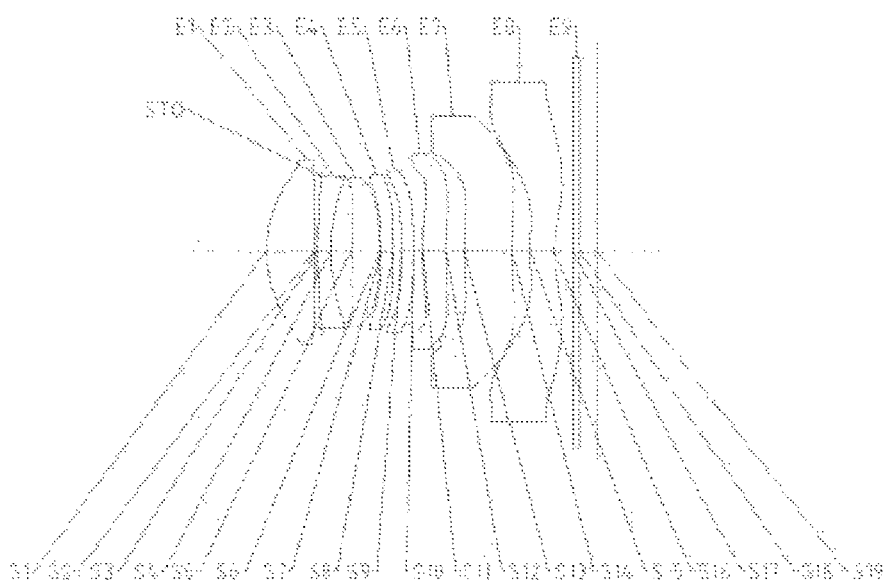
FIG. 23 is a structure diagram of an optical imaging lens according to embodiment 12 of the disclosure.
FIG. 24A to FIG. 24D illustrate a longitudinal aberration curve, an astigmatism curve, a distortion curve and a lateral color curve of an optical imaging lens according to embodiment 12 respectively.

An optical imaging lens according to embodiment 12 of the disclosure is described below with reference to FIG. 23 to FIG. 24D. FIG. 23 is a structure diagram of an optical imaging lens according to embodiment 12 of the disclosure.

As shown in FIG. 23, the optical imaging lens according to the embodiment of the disclosure includes a first lens E1, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a concave surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a positive refractive power, an object-side surface S9 of the fifth lens is a concave surface, and an imaging-side surface S10 of the fifth lens is a convex surface. The sixth lens E6 has a positive refractive power, an object-side surface S11 of the sixth lens is a convex surface, and an imaging-side surface S12 of the sixth lens is a concave surface. The seventh lens E7 has a positive refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 34 shows the surface type, the radius of curvature, thickness, the material and conic coefficient of each lens of the optical imaging lens according to embodiment 12. Units of the radius of curvature and the thickness are millimeter (mm).

TABLE 34

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspheric | 2.0820 | 0.8194 | 1.55 | 56.1 | −0.1207 |
| S2 | Aspheric | 60.9272 | 0.1257 | | | −99.0000 |
| STO | Spherical | Infinite | −0.0764 | | | 0.0000 |
| S3 | Aspheric | 6.8227 | 0.2300 | 1.65 | 23.5 | −85.2855 |
| S4 | Aspheric | 2.8807 | 0.3325 | | | 3.1466 |
| S5 | Aspheric | 12.2111 | 0.4804 | 1.55 | 56.1 | 95.7339 |
| S6 | Aspheric | −6.9663 | 0.0250 | | | 21.7334 |
| S7 | Aspheric | −9.6014 | 0.2000 | 1.55 | 56.1 | 48.8368 |
| S8 | Aspheric | −38.6558 | 0.1449 | | | 99.0000 |

TABLE 34-continued

| Surface number | Surface type | Radius of curvature | Thickness | Material Refractive index | Abbe number | Conic coefficient |
|---|---|---|---|---|---|---|
| S9 | Aspheric | −14.0000 | 0.2046 | 1.66 | 21.5 | 16.6842 |
| S10 | Aspheric | −13.0000 | 0.1531 | | | 79.1302 |
| S11 | Aspheric | 8.2009 | 0.3995 | 1.55 | 56.1 | 15.1429 |
| S12 | Aspheric | 10.7418 | 0.3097 | | | −11.4177 |
| S13 | Aspheric | 5.9043 | 0.8018 | 1.65 | 23.5 | −64.3335 |
| S14 | Aspheric | 7.8740 | 0.3123 | | | −99.0000 |
| S15 | Aspheric | 5.9510 | 0.4035 | 1.54 | 55.7 | −16.8811 |
| S16 | Aspheric | 1.8081 | 0.3243 | | | −0.7776 |
| S17 | Spherical | Infinite | 0.1213 | 1.52 | 64.2 | |
| S18 | Spherical | Infinite | 0.3003 | | | |
| S19 | Spherical | Infinite | | | | |

From Table 34, it can be seen that, in embodiment 12, both the object-side surface and imaging-side surface of any lens in the first lens E1 to the eighth lens E8 are aspheric surfaces. Table 35 shows higher-order coefficients applied to each aspheric mirror surface in embodiment 12. The surface type of each aspheric surface is defined by formula (1) given in embodiment 1.

TABLE 35

| Surface number | A4 | A6 | A8 | A10 | A12 |
|---|---|---|---|---|---|
| S1 | −4.1930E−03 | 2.5567E−02 | −7.5720E−02 | 1.2610E−01 | −1.2937E−01 |
| S2 | 3.4855E−02 | −1.4622E−01 | 3.0283E−01 | −3.9921E−01 | 3.4262E−01 |
| S3 | 3.0922E−02 | −2.0460E−01 | 4.5796E−01 | −6.4463E−01 | 6.3514E−01 |
| S4 | −4.8383E−02 | −8.3660E−02 | 2.0808E−01 | −2.3472E−01 | 4.7685E−02 |
| S5 | −2.9159E−02 | 1.2919E−02 | −2.8218E−01 | 9.2141E−01 | −1.7310E+00 |
| S6 | 4.5809E−03 | −1.5079E−01 | −1.3195E−01 | 8.3708E−01 | −1.2613E+00 |
| S7 | −3.3543E−03 | −1.0488E−01 | −1.5515E−01 | 7.5875E−01 | −1.1211E+00 |
| S8 | −5.6560E−02 | −1.7890E−02 | 1.5048E−01 | −3.3944E−01 | 2.6899E−01 |
| S9 | −1.7508E−02 | −2.0664E−01 | 3.5015E−01 | −8.9450E−02 | −6.6630E−01 |
| S10 | 9.2688E−02 | −4.7676E−01 | 9.4968E−01 | −1.2712E+00 | 1.1216E+00 |
| S11 | 1.0248E−01 | −2.9727E−01 | 4.4560E−01 | −4.8814E−01 | 3.4041E−01 |
| S12 | −1.0254E−03 | −7.1900E−02 | 1.4450E−01 | −1.7527E−01 | 1.1614E−01 |
| S13 | −1.3278E−02 | −7.5480E−02 | 6.0683E−02 | −1.7190E−02 | −1.3620E−02 |
| S14 | 3.3037E−02 | −8.1260E−02 | 5.9231E−02 | −2.7090E−02 | 7.6200E−03 |
| S15 | −1.6496E−01 | 3.4244E−02 | 8.4100E−03 | −6.2500E−03 | 1.5840E−03 |
| S16 | −2.1155E−01 | 9.3230E−02 | −3.3850E−02 | 8.8950E−03 | −1.5400E−03 |

| Surface number | A14 | A16 | A18 | A20 |
|---|---|---|---|---|
| S1 | 8.1600E−02 | −3.0890E−02 | 6.3430E−03 | −5.4000E−04 |
| S2 | −1.9153E−01 | 6.6938E−02 | −1.3230E−02 | 1.1270E−03 |
| S3 | −4.3135E−01 | 1.9186E−01 | −4.9910E−02 | 5.7140E−03 |
| S4 | 2.4421E−01 | −3.2894E−01 | 1.7808E−01 | −3.6540E−02 |
| S5 | 2.0289E+00 | −1.4509E+00 | 5.7795E−01 | −9.8620E−02 |
| S6 | 9.8012E−01 | −4.2707E−01 | 9.8445E−02 | −9.3100E−03 |
| S7 | 8.7322E−01 | −3.8140E−01 | 8.9144E−02 | −8.6200E−03 |
| S8 | −3.2930E−02 | −6.4600E−02 | 3.3842E−02 | −4.9800E−03 |
| S9 | 1.1520E+00 | −8.4856E−01 | 3.0129E−01 | −4.2130E−02 |
| S10 | −6.1369E−01 | 1.9500E−01 | −3.2320E−02 | 2.1800E−03 |
| S11 | −1.4254E−01 | 3.2314E−02 | −3.1200E−03 | 0.0000E+00 |
| S12 | −4.3200E−02 | 8.4370E−03 | −6.7000E−04 | 0.0000E+00 |
| S13 | 1.2394E−02 | −3.7100E−03 | 3.9700E−04 | 0.0000E+00 |
| S14 | −1.2700E−03 | 1.1400E−04 | −4.2000E−06 | 0.0000E+00 |
| S15 | −2.1000E−04 | 1.4900E−05 | −4.3000E−07 | 0.0000E+00 |
| S16 | 1.6400E−04 | −9.7000E−06 | 2.4300E−07 | 0.0000E+00 |

Table 36 shows effective focal lengths f1 to f8 of the lenses in embodiment 12, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 36

| f1(mm) | 3.93 | f7(mm) | 31.56 |
|---|---|---|---|
| f2(mm) | −7.91 | f8(mm) | −5.00 |
| f3(mm) | 8.19 | f(mm) | 4.45 |
| f4(mm) | −23.43 | TTL(mm) | 5.61 |

TABLE 36-continued

| f5(mm) | 255.79 | ImgH(mm) | 3.57 |
|---|---|---|---|
| f6(mm) | 60.10 | FOV(°) | 75.9 |

FIG. 24A illustrates a longitudinal aberration curve of the optical imaging lens according to embodiment 12 to represent deviation of a convergence focal point after light with different wavelengths passes through the lens. FIG. 24B illustrates an astigmatism curve of the optical imaging lens according to embodiment 12 to represent a tangential image surface curvature and a sagittal image surface curvature. FIG. 24C illustrates a distortion curve of the optical imaging lens according to embodiment 12 to represent a distortion value under different viewing angles. FIG. 24D illustrates a lateral color curve of the optical imaging lens according to embodiment 12 to represent deviation of different image heights on the imaging surface after the light passes through the lens. According to FIG. 24A to FIG. 24D, it can be seen that the optical imaging lens provided in embodiment 12 can achieve high imaging quality.

Embodiment 13

Figure 25:
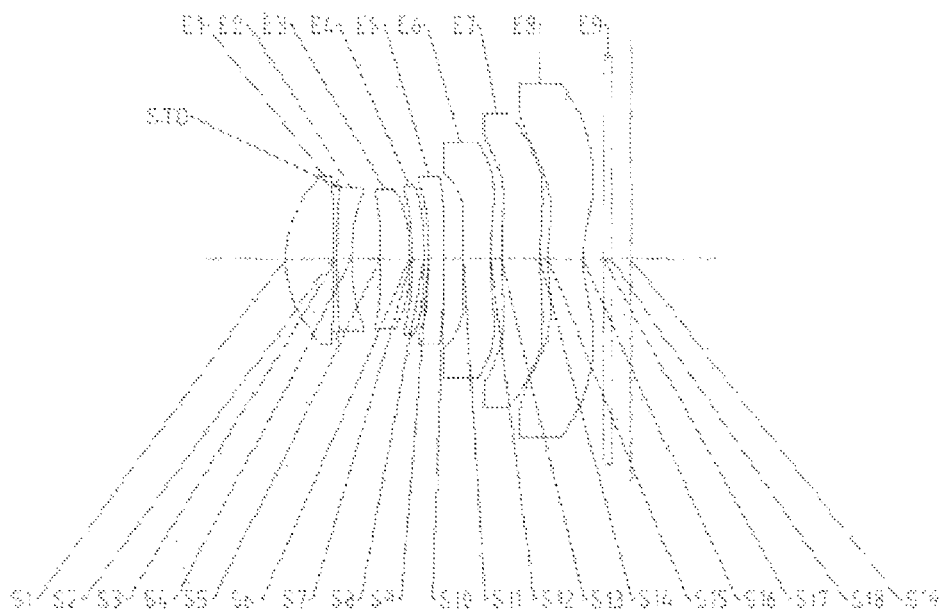
FIG. 25 is a structure diagram of an optical imaging lens according to embodiment 13 of the disclosure.

An optical imaging lens according to embodiment 13 of the disclosure is described below with reference to FIG. 25 to FIG. 26D. FIG. 25 is a structure diagram of an optical imaging lens according to embodiment 13 of the disclosure.

As shown in FIG. 25, the optical imaging lens according to the embodiment of the disclosure includes a first lens E1, a diaphragm STO, a first lens E2, a third lens E3, a fourth lens E4, a fifth lens E5, a sixth lens E6, a seventh lens E7, an eighth lens E8, an optical filter E9 and an imaging surface S19, which are provided in sequence from an object side to an imaging side along an optical axis.

The first lens E1 has a positive refractive power, an object-side surface S1 of the first lens is a convex surface, and an imaging-side surface S2 of the first lens is a convex surface. The second lens E2 has a negative refractive power, an object-side surface S3 of the second lens is a convex surface, and an imaging-side surface S4 of the second lens is a concave surface. The third lens E3 has a positive refractive power, an object-side surface S5 of the third lens is a convex surface, and an imaging-side surface S6 of the third lens is a convex surface. The fourth lens E4 has a negative refractive power, an object-side surface S7 of the fourth lens is a concave surface, and an imaging-side surface S8 of the fourth lens is a convex surface. The fifth lens E5 has a positive refractive power, an object-side surface S9 of the fifth lens is a concave surface, and an imaging-side surface S10 of the fifth lens is a convex surface. The sixth lens E6 has a negative refractive power, an object-side surface S11 of the sixth lens is a convex surface, and an imaging-side surface S12 of the sixth lens is a concave surface. The seventh lens E7 has a negative refractive power, an object-side surface S13 of the seventh lens is a convex surface, and an imaging-side surface S14 of the seventh lens is a concave surface. The eighth lens E8 has a negative refractive power, an object-side surface S15 of the eighth lens is a convex surface, and an imaging-side surface S16 of the eighth lens is a concave surface. The optical filter E9 has an object-side surface S17 and an imaging-side surface S17. Light from an object sequentially penetrates through each of the surfaces S1 to S18 and is finally image on the imaging surface S19.

Table 37 shows the surface type, the radius of curvature, thickness, the material and conic coefficient of each lens of the optical imaging lens according to embodiment 13. Units of the radius of curvature and the thickness are millimeter (mm).

TABLE 37

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 1.8454 | 0.7556 | 1.55 | 56.1 | −0.0692 |
| S2 | Aspheric | −1,983.3300 | 0.0725 | | | −99.0000 |
| STO | Spherical | Infinite | −0.0129 | | | 0.0000 |
| S3 | Aspheric | 8.9333 | 0.2420 | 1.65 | 23.5 | −99.0000 |
| S4 | Aspheric | 3.0484 | 0.4607 | | | 4.4544 |
| S5 | Aspheric | 37.4809 | 0.4734 | 1.55 | 56.1 | −42.0184 |
| S6 | Aspheric | −5.9196 | 0.0362 | | | 23.9843 |
| S7 | Aspheric | −9.9409 | 0.2000 | 1.55 | 56.1 | 45.8084 |
| S8 | Aspheric | −19.0275 | 0.0716 | | | 62.6019 |
| S9 | Aspheric | −16.0000 | 0.2534 | 1.66 | 21.5 | −54.7095 |
| S10 | Aspheric | −15.0000 | 0.3006 | | | −42.0130 |
| S11 | Aspheric | 39.0602 | 0.4384 | 1.55 | 56.1 | −99.0000 |
| S12 | Aspheric | 7.0547 | 0.1775 | | | −26.0012 |
| S13 | Aspheric | 11.9221 | 0.6136 | 1.65 | 23.5 | −1.2586 |
| S14 | Aspheric | 5.9550 | 0.1271 | | | −99.0000 |
| S15 | Aspheric | 2.5333 | 0.5601 | 1.54 | 55.7 | −14.8657 |
| S16 | Aspheric | 1.7699 | 0.3385 | | | −0.8006 |
| S17 | Spherical | Infinite | 0.1155 | 1.52 | 64.2 | |
| S18 | Spherical | Infinite | 0.3158 | | | |
| S19 | Spherical | Infinite | | | | |

From Table 37, it can be seen that, in embodiment 13, both the object-side surface and imaging-side surface of any lens in the first lens E1 to the eighth lens E8 are aspheric surfaces. Table 38 shows higher-order coefficients applied to each aspheric mirror surface in embodiment 13. The surface type of each aspheric surface is defined by formula (1) given in embodiment 1.

TABLE 38

| Surface number | A4 | A6 | A8 | A10 | A12 |
|---|---|---|---|---|---|
| S1 | 2.3555E−03 | 1.1690E−04 | −8.4000E−05 | 6.9400E−04 | −1.8600E−03 |
| S2 | −2.1921E−02 | 6.3546E−02 | −9.8830E−02 | 9.8506E−02 | −6.6550E−02 |
| S3 | −5.7573E−02 | 1.0311E−01 | −1.1708E−01 | 8.4318E−02 | 1.6019E−02 |
| S4 | −7.6695E−02 | 4.9447E−02 | 1.5037E−02 | −1.7507E−01 | 4.1343E−01 |
| S5 | −4.5059E−02 | −5.8955E−02 | 6.2542E−02 | −2.0200E−03 | −2.7721E−01 |
| S6 | 1.6106E−01 | −8.6954E−01 | 9.6411E−01 | 7.0240E−01 | −3.2258E+00 |
| S7 | 1.9380E−01 | −7.4959E−01 | 2.3952E−01 | 2.6056E+00 | −6.0068E+00 |
| S8 | −2.3619E−01 | 8.5346E−01 | −2.2331E+00 | 3.7525E+00 | −4.1172E+00 |
| S9 | −2.7497E−01 | 9.9765E−01 | −2.0927E+00 | 2.6505E+00 | −2.1417E+00 |
| S10 | −7.5114E−02 | 3.6968E−01 | −7.7497E−01 | 8.8641E−01 | −6.0000E−01 |
| S11 | −3.7039E−02 | 6.0823E−02 | −2.6042E−01 | 4.2275E−01 | −4.2854E−01 |
| S12 | 7.1172E−02 | −1.6636E−01 | 1.5744E−01 | −1.0420E−01 | 4.6410E−02 |
| S13 | 8.5354E−02 | −1.9226E−01 | 1.8054E−01 | −1.1766E−01 | 4.9711E−02 |
| S14 | 3.6664E−02 | −8.5386E−02 | 6.1173E−02 | −2.8200E−02 | 8.0900E−03 |
| S15 | −1.2752E−01 | 1.2634E−02 | 1.8708E−02 | −1.0670E−02 | 2.8570E−03 |
| S16 | −1.9632E−01 | 8.2797E−02 | −2.9400E−02 | 7.6610E−03 | −1.3300E−03 |

| Surface number | A14 | A16 | A18 | A20 |
|---|---|---|---|---|
| S1 | 8.4400E−04 | 3.6200E−05 | −2.8000E−04 | 3.2100E−05 |
| S2 | 2.8728E−02 | −8.3800E−03 | 1.9320E−03 | −3.2000E−04 |
| S3 | −9.9670E−02 | 9.6328E−02 | −4.2020E−02 | 7.1970E−03 |
| S4 | −5.0574E−01 | 3.4232E−01 | −1.1304E−01 | 1.1858E−02 |
| S5 | 6.4396E−01 | −6.8690E−01 | 3.6896E−01 | −8.1330E−02 |
| S6 | 4.1372E+00 | −2.7751E+00 | 9.8118E−01 | −1.4301E−01 |
| S7 | 6.6374E+00 | −4.1956E+00 | 1.4593E+00 | −2.1656E−01 |
| S8 | 2.9356E+00 | −1.3262E+00 | 3.4507E−01 | −3.8470E−02 |
| S9 | 1.1228E+00 | −3.9467E−01 | 9.5156E−02 | −1.2920E−02 |
| S10 | 2.3274E−01 | −4.2760E−02 | 3.4900E−04 | 7.2700E−04 |
| S11 | 2.6648E−01 | −9.3600E−02 | 1.4028E−02 | 0.0000E+00 |
| S12 | −1.3060E−02 | 2.0820E−03 | −1.4000E−04 | 0.0000E+00 |
| S13 | −1.2580E−02 | 1.7250E−03 | −9.9000E−05 | 0.0000E+00 |
| S14 | −1.3500E−03 | 1.2000E−04 | −4.3000E−06 | 0.0000E+00 |
| S15 | −4.3000E−04 | 3.4200E−05 | −1.1000E−06 | 0.0000E+00 |
| S16 | 1.4200E−04 | −8.3000E−06 | 2.0700E−07 | 0.0000E+00 |

Table 39 shows effective focal lengths f1 to f8 of the lenses in embodiment 13, a total effective focal length f of the optical imaging lens, a TTL which is a distance from a center of the object-side surface S1 of the first lens E1 to the imaging surface S19 on the optical axis, a ImgH which is a half of a diagonal length of an effective pixel region on the imaging surface S19 and a full FOV of the optical imaging lens.

TABLE 39

| f1(mm) | 3.37 | f7(mm) | −19.22 |
|---|---|---|---|
| f2(mm) | −7.29 | f8(mm) | −14.70 |
| f3(mm) | 9.39 | f(mm) | 4.68 |
| f4(mm) | −38.39 | TTL(mm) | 5.54 |
| f5(mm) | 331.37 | ImgH(mm) | 3.40 |
| f6(mm) | −15.83 | FOV(°) | 70.5 |

Figures 26A, 26B:
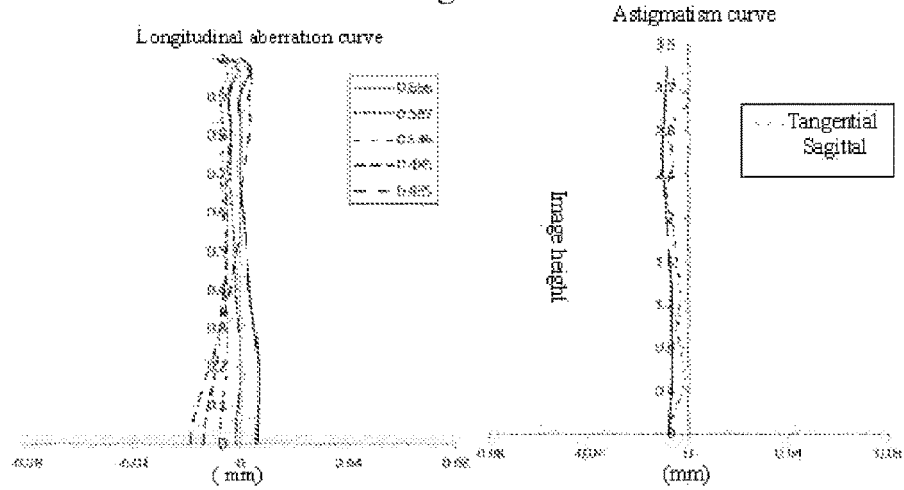
FIG. 26A to FIG. 26D illustrate a longitudinal aberration curve, an astigmatism curve, a distortion curve and a lateral color curve of an optical imaging lens according to embodiment 13 respectively.
Figures 26C, 26D:
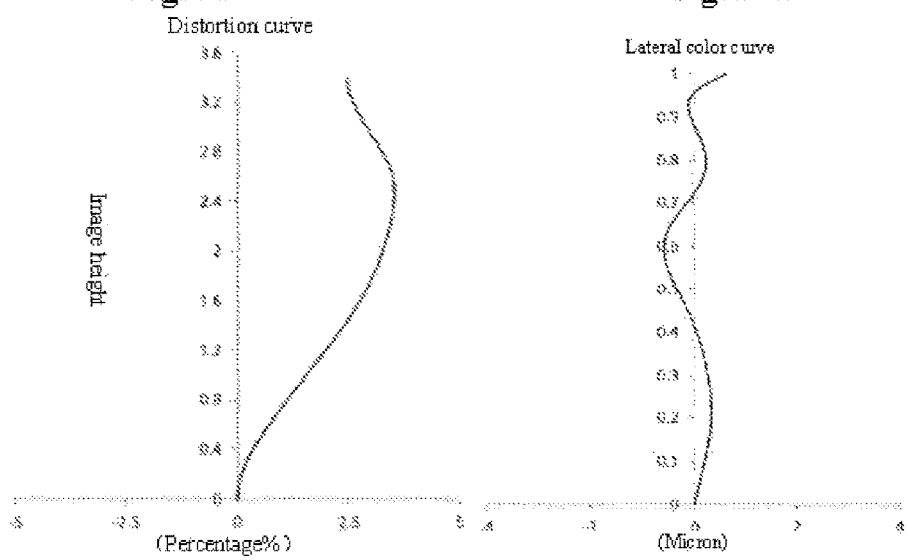

FIG. 26A illustrates a longitudinal aberration curve of the optical imaging lens according to embodiment 13 to represent deviation of a convergence focal point after light with different wavelengths passes through the lens. FIG. 26B illustrates an astigmatism curve of the optical imaging lens according to embodiment 13 to represent a tangential image surface curvature and a sagittal image surface curvature. FIG. 26C illustrates a distortion curve of the optical imaging lens according to embodiment 13 to represent a distortion value under different viewing angles. FIG. 26D illustrates a lateral color curve of the optical imaging lens according to embodiment 13 to represent deviation of different image heights on the imaging surface after the light passes through the lens. According to FIG. 26A to FIG. 26D, it can be seen that the optical imaging lens provided in embodiment 13 may achieve high imaging quality.

From the above, embodiment 1 to embodiment 13 meet a relationship shown in Table 40 respectively.

TABLE 40

| Conditional expression | embodiment | | | | | | |
|---|---|---|---|---|---|---|---|
| | 1 | 2 | 3 | 4 | 5 | 6 | 7 |
| f/EPD | 1.79 | 1.72 | 1.70 | 1.58 | 1.79 | 1.79 | 1.70 |
| TTL/ImgH | 1.41 | 1.59 | 1.58 | 1.54 | 1.41 | 1.41 | 1.59 |
| FOV (°) | 80.4 | 73.3 | 74.0 | 77.8 | 79.9 | 79.5 | 74.0 |
| f1/f | 0.90 | 0.77 | 0.79 | 0.90 | 0.87 | 0.85 | 0.79 |
| f2/f | −3.30 | −1.86 | −1.83 | −2.00 | −2.93 | −2.71 | −1.72 |
| f3/f | 2.59 | 2.25 | 2.17 | 2.09 | 2.52 | 2.58 | 2.07 |
| f8/f | −2.84 | −2.11 | −2.18 | −1.45 | −4.82 | −4.74 | −2.73 |
| R3/R4 | 1.64 | 2.51 | 2.60 | 2.34 | 1.76 | 1.85 | 2.76 |
| R1/R6 | −0.26 | −0.30 | −0.31 | −0.32 | −0.27 | −0.28 | −0.32 |
| CT3/CT4 | 1.65 | 1.38 | 1.47 | 1.69 | 1.51 | 1.47 | 1.79 |
| R9/R11 | −1.19 | −1.05 | −0.86 | −0.88 | −1.69 | −2.02 | −1.01 |
| (R15 − R16)/(R15 + R16) | 0.23 | 0.26 | 0.24 | 0.40 | 0.16 | 0.16 | 0.20 |
| CT1/CT2 | 2.39 | 3.10 | 3.19 | 3.39 | 2.46 | 2.57 | 3.20 |

| Conditional expression | embodiment | | | | | |
|---|---|---|---|---|---|---|
| | 8 | 9 | 10 | 11 | 12 | 13 |
| f/EPD | 1.70 | 1.89 | 1.9. | 1.55 | 1.58 | 1.85 |
| TTL/ImgH | 1.60 | 1.45 | 1.53 | 1.56 | 1.57 | 1.63 |
| FOV (°) | 73.6 | 77.0 | 73.4 | 76.7 | 75.9 | 70.5 |
| f1/f | 0.79 | 0.83 | 0.81 | 0.91 | 0.88 | 0.72 |
| f2/f | −1.64 | −2.65 | −2.38 | −1.88 | −1.78 | −1.56 |
| f3/f | 1.96 | 2.49 | 2.49 | 1.86 | 1.84 | 2.01 |
| f8/f | −2.23 | −2.57 | −2.49 | −1.10 | −1.12 | −3.14 |
| R3/R4 | 2.79 | 1.83 | 1.94 | 2.27 | 2.37 | 2.93 |
| R1/R6 | −0.32 | −0.24 | −0.24 | −0.30 | −0.30 | −0.31 |
| CT3/CT4 | 2.18 | 1.73 | 2.00 | 2.35 | 2.40 | 2.37 |
| R9/R11 | −1.36 | −0.94 | −1.06 | −1.28 | −1.71 | −0.41 |

TABLE 40-continued

| | | | | | | |
|---|---|---|---|---|---|---|
| (R15 − R16)/(R15 + R16) | 0.24 | 0.24 | 0.25 | 0.56 | 0.53 | 0.18 |
| CT1/CT2 | 3.26 | 2.48 | 2.71 | 3.52 | 3.56 | 3.12 |

The disclosure also provides an imaging device, of which an electronic photosensitive element may be a CCD or a CMOS. The imaging device may be an independent imaging device such as a digital camera, and may also be an imaging module integrated into a mobile electronic device such as a mobile phone. The imaging device is provided with the abovementioned optical imaging lens.

The above description is only description about the preferred embodiments of the disclosure and adopted technical principles. Those skilled in the art should know that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, comprising a first lens, a second lens, a third lens, a fourth lens, a fifth lens, a sixth lens, a seventh lens and an eighth lens which are provided in sequence from an object side to an imaging side along an optical axis, wherein
the first lens has a positive refractive power, and an object-side surface of the first lens is a convex surface;
the second lens has a negative refractive power;
the third lens has a positive refractive power;
the fourth lens has a positive refractive power or a negative refractive power, an object-side surface of the fourth lens is a concave surface and an imaging-side surface of the fourth lens is a convex surface;
the fifth lens has a positive refractive power or a negative refractive power;
the sixth lens has a positive refractive power or a negative refractive power, and an object-side surface of the sixth lens is a convex surface;
the seventh lens has a positive refractive power or a negative refractive power; and
the eighth lens has a negative refractive power,
wherein an effective focal length f1 of the first lens and the total effective focal length f of the optical imaging lens meet 0.5<f1/f<1.0.

2. The optical imaging lens as claimed in claim 1, wherein a total effective focal length f of the optical imaging lens and an Entrance Pupil Diameter (EPD) of the optical imaging lens meet f/EPD≤2.0.

3. The optical imaging lens as claimed in claim 1, wherein a Total Track Length (TTL) and an ImgH meet TTL/ImgH≤1.65, the Total Track Length (TTL) is a distance from a center of the object-side surface of the first lens to an imaging surface of the optical imaging lens on the optical axis, the ImgH is a half of a diagonal length of an effective pixel region on the imaging surface of the optical imaging lens.

4. The optical imaging lens as claimed in claim 1, wherein a full Field Of View (FOV) of the optical imaging lens meets 70°≤FOV≤81°.

5. The optical imaging lens as claimed in claim 1, wherein an effective focal length f2 of the second lens and the total effective focal length f of the optical imaging lens meet −3.55≤f2/f≤−1.5.

6. The optical imaging lens as claimed in claim 1, wherein an effective focal length f3 of the third lens and the total effective focal length f of the optical imaging lens meet 1.5≤f3/f≤3.0.

7. The optical imaging lens as claimed in claim 1, wherein an effective focal length f8 of the eighth lens and the total effective focal length f of the optical imaging lens meet −5.0≤f8/f≤−1.0.

8. The optical imaging lens as claimed in claim 1, wherein a radius of curvature R3 of an object-side surface of the second lens and a radius of curvature R4 of an imaging-side surface of the second lens meet 1.5≤R3/R4≤3.0.

9. The optical imaging lens as claimed in claim 1, wherein a radius of curvature R1 of the object-side surface of the first lens and a radius of curvature R6 of an imaging-side surface of the third lens meet −0.5<R1/R6<0.

10. The optical imaging lens as claimed in claim 1, wherein a center thickness CT3 of the third lens on the optical axis and a center thickness CT4 of the fourth lens on the optical axis meet 1.0<CT3/CT4<2.5.

11. The optical imaging lens as claimed in claim 1, wherein a radius of curvature R9 of an object-side surface of the fifth lens and a radius of curvature R11 of the object-side surface of the sixth lens meet −2.5<R9/R11<0.

12. The optical imaging lens as claimed in claim 1, wherein a radius of curvature R15 of an object-side surface of the eighth lens and a radius of curvature R16 of an imaging-side surface of the eighth lens meet (R15−R16)/(R15+R16)<1.0.

13. The optical imaging lens as claimed in claim 1, wherein a center thickness CT1 of the first lens on the optical axis and a center thickness CT2 of the second lens on the optical axis meet 2.0<CT1/CT2<4.0.

14. An optical imaging lens, comprising a first lens, a second lens, a third lens, a fourth lens, a fifth lens, a sixth lens, a seventh lens and an eighth lens which are provided in sequence from an object side to an imaging side along an optical axis, wherein
the first lens has a positive refractive power, and an object-side surface of the first lens is a convex surface;
the second lens has a negative refractive power;
the third lens has a positive refractive power;
each of the fourth lens, the fifth lens and the seventh lens has a positive refractive power or a negative refractive power;
the sixth lens has a positive refractive power or a negative refractive power, and an object-side surface of the sixth lens is a convex surface;
the eighth lens has a negative refractive power; and
a total effective focal length f of the optical imaging lens and an Entrance Pupil Diameter (EPD) of the optical imaging lens meet f/EPD≤2.0,
wherein an effective focal length f1 of the first lens and the total effective focal length f of the optical imaging lens meet 0.5<f1/f<1.0.

15. The optical imaging lens as claimed in claim 14, wherein an effective focal length f2 of the second lens and the total effective focal length f of the optical imaging lens meet −3.5≤f2/f≤−1.5.

16. The optical imaging lens as claimed in claim 15, wherein a radius of curvature R3 of an object-side surface of the second lens and a radius of curvature R4 of an imaging-side surface of the second lens meet 1.5≤R3/R4≤3.0.

17. The optical imaging lens as claimed in claim 16, wherein the object-side surface of the second lens is a concave surface, and the imaging-side surface of the second lens is a concave surface.

18. The optical imaging lens as claimed in claim 14, wherein an effective focal length f3 of the third lens and the total effective focal length f of the optical imaging lens meet 1.5≤f3/f≤3.0, wherein an imaging-side surface of the third lens is a convex surface, wherein a radius of curvature R1 of the object-side surface of the first lens and a radius of curvature R6 of the imaging-side surface of the third lens meet −0.5<R1/R6<0, wherein an object-side surface of the fourth lens is a concave surface, and an imaging-side surface of the fourth lens is a convex surface, wherein an object-side surface of the fifth lens is a concave surface, wherein a radius of curvature R9 of the object-side surface of the fifth lens and a radius of curvature R11 of the object-side surface of the sixth lens meet −2.5<R9/R11<0, wherein an effective focal length f8 of the eighth lens and the total effective focal length f of the optical imaging lens meet −5.0≤f8/f≤−1.0, wherein a radius of curvature R15 of an object-side surface of the eighth lens and a radius of curvature R16 of an imaging-side surface of the eighth lens meet (R15−R16)/(R15+R16)<1.0, wherein a full Field Of View (FOV) of the optical imaging lens meets 70°≤FOV≤81°, wherein a Total Track Length (TTL) and an ImgH meet TTL/ImgH≤1.65, the Total Track Length (TTL) is a distance from a center of the object-side surface of the first lens to an imaging surface of the optical imaging lens on the optical axis, the ImgH is a half of a diagonal length of an effective pixel region on the imaging surface of the optical imaging lens.

19. The optical imaging lens as claimed in claim 18, wherein a center thickness CT1 of the first lens on the optical axis and a center thickness CT2 of the second lens on the optical axis meet 2.0<CT1/CT2<4.0.

20. The optical imaging lens as claimed in claim 18, wherein a center thickness CT3 of the third lens on the optical axis and a center thickness CT4 of the fourth lens on the optical axis meet 1.0<CT3/CT4<2.5.

* * * * *